US007830934B2

(12) United States Patent  
Jacques et al.

(10) Patent No.: US 7,830,934 B2  
(45) Date of Patent: Nov. 9, 2010

(54) MULTI-CHAMBER GAS DISCHARGE LASER BANDWIDTH CONTROL THROUGH DISCHARGE TIMING

(75) Inventors: Robert N. Jacques, San Diego, CA (US); William N. Partlo, Poway, CA (US); Daniel J. W. Brown, San Diego, CA (US)

(73) Assignee: Cymer, Inc., San Diego, CA (US)

( * ) Notice: Subject to any disclaimer, the term of this patent is extended or adjusted under 35 U.S.C. 154(b) by 804 days.

(21) Appl. No.: 11/323,604

(22) Filed: Dec. 29, 2005

(65) Prior Publication Data

US 2006/0146900 A1    Jul. 6, 2006

Related U.S. Application Data

(63) Continuation-in-part of application No. 11/199,691, filed on Aug. 9, 2005, now Pat. No. 7,061,961, which is a continuation of application No. 10/627,215, filed on Jul. 24, 2003, now Pat. No. 6,985,508, which is a continuation of application No. 10/012,002, filed on Nov. 30, 2001, now Pat. No. 6,625,191, which is a continuation-in-part of application No. 09/943,343, filed on Aug. 29, 2001, now Pat. No. 6,567,450.

(51) Int. Cl.  
*H01S 3/00* (2006.01)

(52) U.S. Cl. .............. 372/38.02; 372/38.01; 372/38.03; 372/38.07; 372/29.015; 372/55

(58) Field of Classification Search ........... 372/38.1, 372/55, 68, 38.02, 38.03, 38.07, 29.015, 372/29.01  
See application file for complete search history.

(56) References Cited

U.S. PATENT DOCUMENTS

| 4,223,279 A | 9/1980 | Bradford, Jr. et al. ...... 331/94.5 |
| 4,410,992 A | 10/1983 | Javan ........................... 372/32 |
| 4,455,658 A | 6/1984 | Sutter et al. .................... 372/38 |
| 4,550,408 A | 10/1985 | Karning et al. ................ 372/58 |
| 4,891,820 A | 1/1990 | Rando et al. ................... 372/93 |
| 4,959,840 A | 9/1990 | Akins et al. .................... 372/57 |
| 5,005,180 A | 4/1991 | Edelman et al. ............... 372/57 |

(Continued)

FOREIGN PATENT DOCUMENTS

JP        2601410        1/1997

(Continued)

*Primary Examiner*—Minsun Harvey  
*Assistant Examiner*—Delma R Forde

(57) ABSTRACT

A method and apparatus are disclosed for controlling bandwidth in a multi-portion laser system comprising a first line narrowed oscillator laser system portion providing a line narrowed seed pulse to an amplifier laser system portion, may comprise utilizing a timing difference curve defining a relationship between a first laser system operating parameter other than bandwidth and the timing difference and also a desired point on the curve defining a desired timing difference, wherein each unique operating point on the curve corresponds to a respective bandwidth value; determining an actual offset from the timing difference at the desired point on the curve to an actual operating point on the curve; determining an error between the actual offset and a desired offset corresponding to a desired bandwidth; modifying the firing differential timing to remove the error between the actual offset and the desired offset.

33 Claims, 18 Drawing Sheets

U.S. PATENT DOCUMENTS

| | | | |
|---|---|---|---|
| 5,017,499 A | 5/1991 | Hakuta et al. | 436/124 |
| 5,023,884 A | 6/1991 | Akins et al. | 372/57 |
| 5,025,445 A | 6/1991 | Anderson et al. | 372/20 |
| 5,025,446 A | 6/1991 | Kuizenga | 372/21 |
| 5,090,020 A | 2/1992 | Bedwell | 372/59 |
| 5,142,543 A | 8/1992 | Wakabayashi et al. | 372/32 |
| 5,149,659 A | 9/1992 | Hakuta et al. | 436/55 |
| 5,189,678 A | 2/1993 | Ball et al. | 372/28 |
| 5,313,481 A | 5/1994 | Cook et al. | 372/37 |
| 5,315,611 A | 5/1994 | Ball et al. | 372/56 |
| 5,359,620 A | 10/1994 | Akins | 372/58 |
| 5,416,391 A | 5/1995 | Correa et al. | 318/558 |
| 5,440,578 A | 8/1995 | Sandstrom | 372/59 |
| 5,448,580 A | 9/1995 | Birx et al. | 372/38 |
| 5,450,436 A | 9/1995 | Mizoguchi et al. | 372/59 |
| 5,471,965 A | 12/1995 | Kapich | 123/565 |
| 5,642,374 A | 6/1997 | Wakabayashi et al. | 372/57 |
| 5,754,579 A | 5/1998 | Mizoguchi et al. | 372/58 |
| 5,771,258 A | 6/1998 | Morton et al. | 372/57 |
| 5,835,199 A * | 11/1998 | Phillips et al. | 356/5.03 |
| 5,852,621 A | 12/1998 | Sandstrom | 372/25 |
| 5,863,017 A | 1/1999 | Larson et al. | 248/176.1 |
| 5,898,725 A | 4/1999 | Fomenkov et al. | 372/102 |
| 5,953,360 A | 9/1999 | Vitruk et al. | 372/87 |
| 5,978,394 A | 11/1999 | Newman et al. | 372/32 |
| 5,978,406 A | 11/1999 | Rokni et al. | 372/58 |
| 5,982,800 A | 11/1999 | Ishihara et al. | 372/57 |
| 5,991,324 A | 11/1999 | Knowles et al. | 372/57 |
| 6,005,879 A | 12/1999 | Sandstrom et al. | 372/25 |
| 6,014,398 A | 1/2000 | Hofmann et al. | 372/60 |
| 6,016,325 A | 1/2000 | Ness et al. | 372/38 |
| 6,018,537 A | 1/2000 | Hofmann et al. | 372/25 |
| 6,028,880 A | 2/2000 | Carlesi et al. | 372/58 |
| 6,067,311 A | 5/2000 | Morton et al. | 372/58 |
| 6,094,448 A | 7/2000 | Fomenkov et al. | 372/102 |
| 6,104,735 A | 8/2000 | Webb | 372/37 |
| 6,128,323 A | 10/2000 | Myers et al. | 372/38 |
| 6,130,904 A | 10/2000 | Ishihara et al. | 372/59 |
| 6,151,349 A | 11/2000 | Gong et al. | 372/58 |
| 6,151,350 A | 11/2000 | Komori et al. | 372/59 |
| 6,164,116 A | 12/2000 | Rice et al. | 73/1.72 |
| 6,188,710 B1 | 2/2001 | Besaucele et al. | 372/60 |
| 6,192,064 B1 | 2/2001 | Algots et al. | 372/99 |
| 6,208,674 B1 | 3/2001 | Webb et al. | 372/57 |
| 6,208,675 B1 | 3/2001 | Webb | 372/58 |
| 6,212,211 B1 | 4/2001 | Azzola et al. | 372/33 |
| 6,212,214 B1 | 4/2001 | Vogler et al. | 372/59 |
| 6,219,368 B1 | 4/2001 | Govorkov | 372/59 |
| 6,240,117 B1 | 5/2001 | Gong et al. | 372/58 |
| 6,243,406 B1 | 6/2001 | Heist et al. | 372/59 |
| 6,314,119 B1 | 11/2001 | Morton | 372/57 |
| 6,317,447 B1 | 11/2001 | Partlo et al. | 372/57 |
| 6,330,261 B1 | 12/2001 | Ishihara et al. | 372/38.1 |
| 6,330,267 B1 | 12/2001 | Vogler et al. | 372/59 |
| 6,359,922 B1 | 3/2002 | Partlo et al. | 372/58 |
| 6,370,174 B1 | 4/2002 | Onkels et al. | 372/38.04 |
| 6,381,257 B1 | 4/2002 | Ershov et al. | 372/57 |
| 6,389,052 B2 | 5/2002 | Albrecht et al. | 372/58 |
| 6,396,856 B1 | 5/2002 | Sucha et al. | 372/25 |
| 6,414,979 B2 | 7/2002 | Ujazdowski et al. | 372/87 |
| 6,466,365 B1 | 10/2002 | Maier et al. | 359/355 |
| 6,477,193 B2 | 11/2002 | Oliver et al. | 372/58 |
| 6,490,307 B1 | 12/2002 | De Mos et al. | 372/59 |
| 6,490,308 B2 | 12/2002 | Albrecht et al. | 372/59 |
| 6,493,370 B2 | 12/2002 | Albrecht et al. | 372/58 |
| 6,493,374 B1 | 12/2002 | Fomenkov et al. | 372/102 |
| 6,504,861 B2 | 1/2003 | Albrecht et al. | 372/59 |
| 6,529,533 B1 | 3/2003 | Voss | 372/29.01 |
| 6,532,247 B2 | 3/2003 | Spangler et al. | 372/61 |
| 6,535,531 B1 | 3/2003 | Smith et al. | 372/25 |
| 6,538,737 B2 | 3/2003 | Sandstrom et al. | 356/334 |
| 6,549,551 B2 * | 4/2003 | Ness et al. | 372/38.07 |
| 6,556,600 B2 * | 4/2003 | Sandstrom et al. | 372/25 |
| 6,563,853 B2 | 5/2003 | Heist et al. | 372/57 |
| 6,567,450 B2 | 5/2003 | Myers et al. | 372/55 |
| 6,590,922 B2 * | 7/2003 | Onkels et al. | 372/57 |
| 6,625,191 B2 | 9/2003 | Knowles et al. | 372/55 |
| 6,671,294 B2 | 12/2003 | Kroyan et al. | 372/20 |
| 6,687,562 B2 | 2/2004 | Patel et al. | 700/121 |
| 6,690,704 B2 | 2/2004 | Fallon et al. | 372/58 |
| 6,704,339 B2 | 3/2004 | Lublin et al. | 372/57 |
| 6,721,340 B1 | 4/2004 | Fomenkov et al. | 372/25 |
| 6,750,972 B2 | 6/2004 | Sandstrom et al. | 356/454 |
| 6,757,316 B2 | 6/2004 | Newman et al. | 372/57 |
| 6,765,945 B2 | 7/2004 | Sandstrom et al. | 372/57 |
| 6,782,031 B1 | 8/2004 | Hofmann et al. | 372/90 |
| 6,795,474 B2 | 9/2004 | Partlo et al. | 372/57 |
| 6,798,812 B2 | 9/2004 | Rylov et al. | 372/55 |
| 6,801,560 B2 | 10/2004 | Knowles et al. | 372/55 |
| 6,853,653 B2 | 2/2005 | Spangler et al. | 372/20 |
| 6,865,210 B2 | 3/2005 | Ershov et al. | 372/55 |
| 6,879,617 B2 | 4/2005 | Ariga et al. | 372/55 |
| 6,882,674 B2 | 4/2005 | Wittak et al. | 372/58 |
| 6,904,073 B2 | 6/2005 | Yager et al. | 372/57 |
| 6,912,052 B2 | 6/2005 | Rao et al. | 356/451 |
| 6,963,595 B2 | 11/2005 | Rule et al. | 372/55 |
| 7,079,564 B2 * | 7/2006 | Fallon et al. | 372/55 |
| 2001/0012309 A1 | 8/2001 | Albrecht et al. | 372/55 |
| 2002/0006149 A1 | 1/2002 | Spangler et al. | 372/61 |
| 2002/0012376 A1 | 1/2002 | Das et al. | 372/58 |
| 2002/0048288 A1 | 4/2002 | Kroyan et al. | 372/20 |
| 2002/0071468 A1 * | 6/2002 | Sandstrom et al. | 372/57 |
| 2002/0101589 A1 | 8/2002 | Sandstrom et al. | 356/334 |
| 2002/0101902 A1 | 8/2002 | Albrecht et al. | 372/58 |
| 2002/0105994 A1 | 8/2002 | Partlo et al. | 372/57 |
| 2002/0110174 A1 | 8/2002 | Albrecht et al. | 372/58 |
| 2002/0114370 A1 * | 8/2002 | Onkels et al. | 372/55 |
| 2002/0186739 A1 | 12/2002 | Sandstrom et al. | 372/55 |
| 2003/0219094 A1 | 11/2003 | Basting et al. | 378/34 |
| 2004/0057489 A1 | 3/2004 | Fallon et al. | 372/57 |
| 2005/0094698 A1 | 5/2005 | Besaucele et al. | 372/57 |
| 2005/0109743 A1 | 5/2005 | Tanabe et al. | 219/121.73 |

FOREIGN PATENT DOCUMENTS

| | | |
|---|---|---|
| JP | 09-097951 | 4/1997 |
| JP | 2701184 | 10/1997 |
| JP | 10/074993 | 3/1998 |
| JP | 2000-022255 | 1/2000 |
| JP | 2001-1332793 | 11/2001 |
| JP | 2002-208746 | 7/2002 |
| JP | 3297108 | 7/2002 |
| JP | 2002-294856 | 10/2002 |

* cited by examiner

MULTI-CHAMBER GAS DISCHARGE LASER BANDWIDTH CONTROL THROUGH DISCHARGE TIMING

CROSS-REFERENCE TO RELATED APPLICATIONS

The present application is a continuation-in-part of U.S. patent application Ser. No. 11/199,691, filed Aug. 9, 2005, entitled VERY NARROW BAND, TWO CHAMBER, HIGH REP-RATE, GAS DISCHARGE LASER SYSTEM, which is a continuation of U.S. patent application Ser. No. 10/627,215, filed on Jul. 24, 2003, entitled VERY NARROW BAND, TWO CHAMBER, HIGH REP-RATE, GAS DISCHARGE LASER SYSTEM, which is a continuation of U.S. patent application Ser. No. 10/012,002, filed on Nov. 30, 2001, which is a continuation-in-part of U.S. patent application Ser. No. 09/943,343, entitled VERY NARROW BAND, TWO CHAMBER, HIGH REP-RATE, GAS DISCHARGE LASER SYSTEM, filed on Aug. 29, 2001, the disclosure[s] of which is hereby incorporated by reference.

FIELD OF THE INVENTION

The present invention related to multi-chambered line narrowed gas discharge, e.g., excimer, laser systems.

BACKGROUND OF THE INVENTION

For high power laser light sources, e.g., for use in integrated circuit manufacturing photolithography processes, e.g., with excimer laser technology, e.g., KrF, at 248 µm, ArF at 193 nm or $F_2$, at 157 nm, and currently with such utilizations for lithography as emersion technology, there has come the need for laser output power, e.g., in excess of 60 watts of laser output power and perhaps even up to 200 Watts to maintain desired photolithography throughput. In the past increases in power to meet the needs of, e.g., the integrated circuit photolithography business, have come through ever increasing pulse repetition rates, with the energy per pulse remaining relatively constant and the higher repetition rate generating the higher average output wattage. Demands for spectral power, e.g., both in KrF and ArF have risen to 100 W/pm or more also in the recent past.

Thus typical laser systems up to a year or so ago were operated at around 4 kHz for maximum output power, but to reach 60 watts higher repetition rates were needed for single chamber line narrowed gas discharge, e.g., excimer gas discharge laser systems. While much work is ongoing to solve the many engineering challenges in increasing pulse repetition rate by even 50%, i.e., to 6 kHz, the challenge of getting to 60 plus watts has been answered by the introduction a year or so ago by applicant's assignee Cymer, Inc. of a multi-chambered configuration, e.g., comprising a master oscillator ("MO") and power amplifier ("PA"), together a "MOPA" laser system/architecture. Similar master oscillator seed providing laser systems with other amplifier configurations such as a power oscillator ("PO") can also be used. For purposes of brevity, however, except where expressly indicated otherwise, the term MOPA or the terms MO and PA separately shall be interpreted to mean any such multi-chamber laser system, e.g., a two chamber laser system, e.g., including an oscillator seed pulse generating portion optimizing a beam parameter quality followed by amplification of the seed pulse by an amplifier portion receiving the seed pulse of whatever variety, examples of which being noted above, that serves the amplification function and is tuned for this amplification process, leaving, more or lese, in tact the particular beam quality parameter(s) optimized in the master oscillator section.

The master oscillator forms a more or less usual single chambered laser oscillator cavity, e.g., like those sold by Applicants' assignee under the designation of 6XXX or 7XXX series laser systems. However, the master oscillator in a MOPA or MOPO configuration can be specifically fine tuned for such things as bandwidth optimization and center wavelength control, and/or other beam parameter quality optimization, without concern for the excess energy absorption throughout the oscillator laser system due to an attempt to also produce in the same laser chamber, with appended line narrowing optics, a high power output, e.g., around 5-10 mJ. Such losses can occur especially in the so-called line narrowing package ("LNP") where the normally relatively broad band output of the gas discharge laser, e.g., an excimer laser, measured in nanometers is reduced to an output bandwidth of around a picometer or less. Further, then the amplifier portion can be optimized for amplification of this output of the MO as it is passed through a lasing gain medium, e.g., generated between electrodes in the PA, e.g., during the time the output of the MO is passing through the gain medium, or, e.g., to stimulate the lasing oscillation in a PO configuration. This can generate, e.g., with applicant's assignees XLA 200 series MOPA configured laser systems upwards of around 15 mJ per pulse, at 4 kHz, resulting in 60 Watts output laser power, e.g., for ArF and even higher pulse energies and output power, e.g., 80 plus Watts for KrF, with the limitations being more driven by optical lifetime under the resultant energy densities at 248 nm (KrF) or at 193 nm (ArF) or 157 nm ($F_2$).

Along with this ability to optimize for beam parameters, e.g., bandwidth, in the MO and power output in the amplifier portion, e.g., the PA, comes many engineering challenges to continue to meet the customer's requirements, e.g., for bandwidth stability, dose control and stability, etc. that arise from the multi-chamber, e.g., MOPA architecture, e.g., involving the timing of the supply of electrical energy to the electrodes in the MO after, e.g., receipt of a trigger signal, e.g., from a photolithography scanner and then to the electrodes of the PA at a controlled time after the gas discharge in the MO.

Applicant proposes certain control features for a multi-chambered laser control system to address the requirements presented, e.g., those as noted above.

SUMMARY OF THE INVENTION

A method and apparatus for controlling bandwidth in a multi-portion laser system comprising a first line narrowed oscillator laser system portion providing a line narrowed seed pulse to a second amplifier laser system portion, wherein selection of a differential firing time between the generation of the seed pulse in the first laser system portion and the generation of the laser gain medium in the amplifier laser system portion affects the bandwidth of a laser output light pulse from the multi-portion laser system, is disclosed which may comprise adjusting the differential firing time as a function of a measured bandwidth and a bandwidth target; estimating a current operating point; adjusting halogen gas injection as a function of a current operating point and a desired operating point. The estimating a current operating point step may comprise the use of a function which is readily computable or estimatable from an available measurement of a laser system operating parameter which is monotonic with respect to differential firing time over the expected range of operation. The desired operating point may be determined as a function of at least one of target bandwidth, laser system duty cycle and laser system output pulse energy. The estimating of the current operating point step may comprise utilizing the difference between a current differential firing time and a reference differential firing time. The method and apparatus may further comprise adjusting the differential firing time as a function of bandwidth error. The method and apparatus may comprise selecting the reference differential timing to optimize laser system efficiency. The method and apparatus may comprise estimating the difference between current differential firing time and reference differential firing time as a function of at least one of the derivative of laser system output pulse energy with respect to differential firing time at constant voltage and the laser system output pulse energy at the current operating point. The method and apparatus may comprise estimating the difference between current differential firing time and reference differential firing time as a function of at least one of the derivative of laser system discharge voltage with respect to differential firing time at constant energy, the derivative of laser system output pulse energy with respect to laser system discharge voltage and the laser system output pulse energy at the current operating point. The method and apparatus may comprise estimating the current operating point as a function of at least one of the derivative of the laser system discharge voltage with respect to differential firing time at constant energy and the laser system output pulse energy at the current operating point. The method and apparatus may comprise estimating the current operating point as $(1/E)*dV/dt$, where E is the laser system output pulse energy and $dV/dt$ is the differential of the laser system discharge voltage with respect to differential firing time at constant energy at the current operating point. The method and apparatus may comprise estimating the current operating point as a function of at least one of the derivative of the laser system output pulse energy with respect to differential firing time at constant voltage and the laser system output pulse energy at the current operating point. The method and apparatus may comprise the estimating of the current operating point step comprising utilizing the relationship $(1/E)*dE/dt$, where E is the laser system output pulse energy and $dE/dt$ is the derivative of the laser system output pulse energy with respect to differential firing time at constant voltage at the current operating point. $dE/dt$ may be estimated by applying a dither signal to the differential firing time and computing $dE/dt$ utilizing dither, laser output pulse energy and the actual differential firing time. $dE/dt$ may be estimated by applying a dither signal to the differential firing time and taking a respective ratio of the correlations of dither with laser output pulse energy and the actual differential firing time. $dE/dt$ may be determined from the product of $dE/dV$ and $dV/dt$. The method and apparatus may comprise estimating the derivative of the laser system discharge voltage with respect to differential firing time at constant energy by applying a dither signal to the differential firing time; applying a scaled version of the dither signal to voltage; adapting the scale to minimize energy error; and taking $dV/dt$ as the scale factor. The desired operating point may comprise one which maximizes laser system efficiency. The apparatus and method may comprise adjusting the halogen gas inject sizes as a function of the difference between the current operating point and the desired operating point. A method and apparatus for controlling bandwidth in a multi-portion laser system comprising a first line narrowed oscillator laser system portion providing a line narrowed seed pulse to a second amplifier laser system portion, wherein selection of a differential firing time between the generation of the seed pulse in the first laser system portion and the generation of the laser gain medium in the amplifier laser system portion effects the bandwidth of a laser output light pulse from the multi-portion laser system is disclosed which may comprise: adjusting a target operating point as a function of a measured bandwidth and a target bandwidth; estimating a current operating point; adjusting the differential firing time as a function of a current operating point and a target operating point in order to drive the current operating point to the target operating point; and adjusting halogen gas injection as a function of the current target operating point and a desired target operating point. The estimating a current operating point step may comprise the use of a function which is readily computable or estimatable from an available measurement of a laser system operating parameter which is monotonic with respect to differential firing time over the expected range of operation. The estimating of the current operating point step may comprise utilizing the difference between a current differential firing time and a reference differential firing time. The method and apparatus may comprise estimating the current operating point as a function of at least one of the derivative of the laser system discharge voltage with respect to differential firing time at constant energy and the laser system output pulse energy at the current operating point. The method and apparatus may comprise estimating the derivative of the laser system discharge voltage with respect to differential firing time at constant energy by applying a dither signal to the differential firing time; applying a scaled version of the dither signal to voltage; adapting the scale to minimize energy error; and taking $dV/dt$ as the scale factor. The method and apparatus may comprise estimating the current operating point as a function of at least one of the derivative of the laser system output pulse energy with respect to differential firing time at constant voltage and the laser system output pulse energy at the current operating point. The differential of the laser system operating energy with respect to time may be estimated by applying a dither signal to the differential firing time and taking a respective ratio of the correlations of dither with laser output pulse energy and the actual differential firing time. The differential of the laser system operating energy with respect to time may be estimated by applying a dither signal to the differential firing time and computing $dE/dt$ utilizing dither, laser output pulse energy and the actual differential firing time. The differential of the laser system operating energy with respect to time may be determined from the product of $dE/dV$ and $dV/dt$. The desired operating point may comprise one which maximizes laser system efficiency.

DETAILED DESCRIPTION OF PREFERRED EMBODIMENTS

Figure 1:
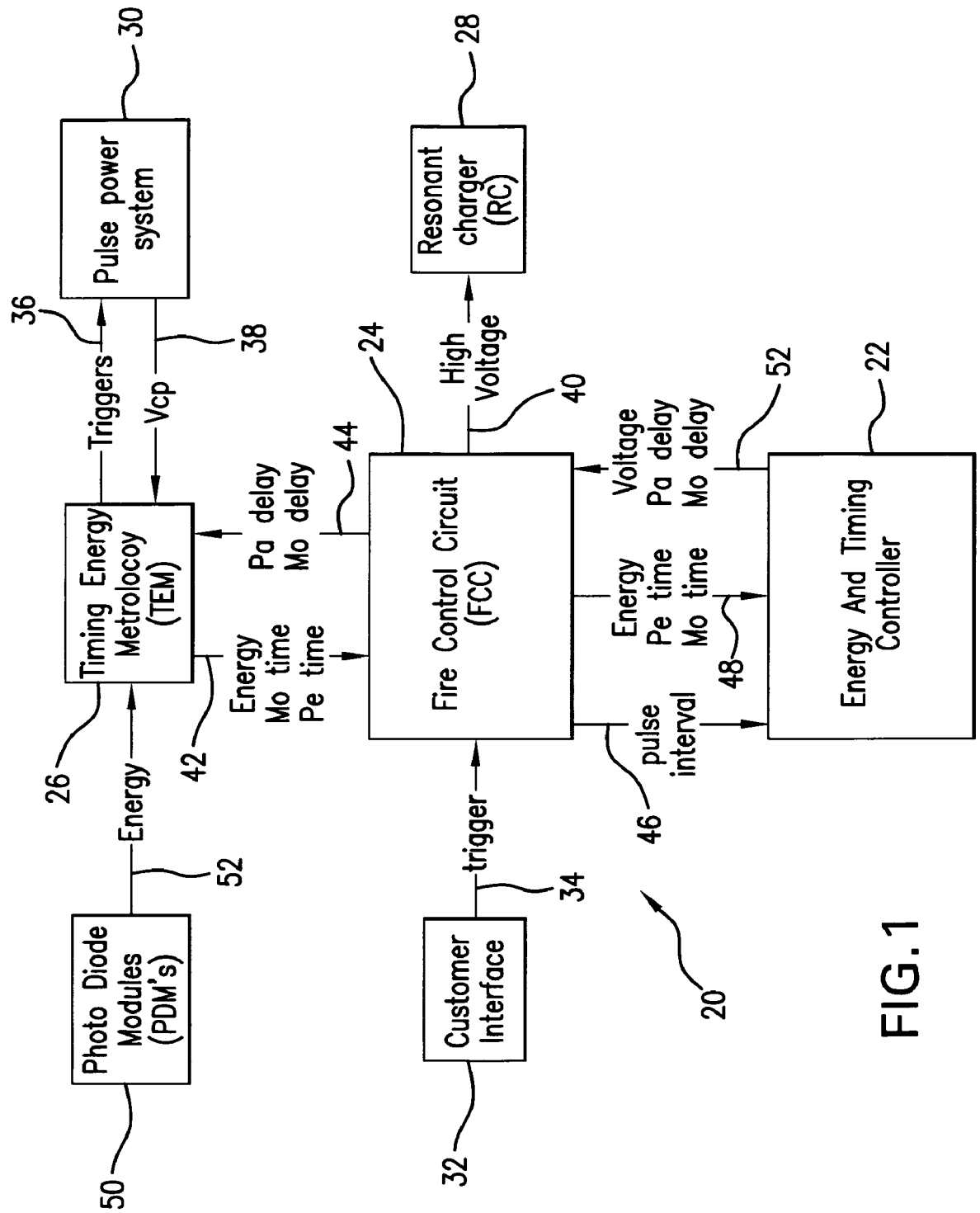
FIG. 1 shows an exemplary system architecture in schematic block diagram form useful for multi-chambered laser system timing and energy control.

According to a theory of operation for the energy and timing controller useable with aspects of an embodiment of the present invention, e.g., as used with one or more of Applicant's assignee's laser systems currently designated as XLA XXX (1XX, 2XX, 3XX, etc.) series laser systems the present application describes system level requirements relating to, e.g., energy and timing controller design and how, e.g., an energy and timing controller fits into an overall multi-chambered laser system, along with data flow and timing through an appropriate algorithm and also the algorithm design itself.

The following acronyms may be utilized in the present application: analog-to-digital converter ("ADC"), fire control circuit ("FCC"), fire control processor ("FCP"), internet service routine ("ISR"), master oscillator ("MO"), e.g., a laser resonator in a master oscillator-power amplifier ("MOPA") or master oscillator-power oscillator ("MOPO") system, which may include line narrowing, ("MSD"), photodetector module ("PDM"), resonant charger ("RC"), signal processing group ("SPG") and timing and energy control module ("TEM").

The energy and timing controller's purpose is to help the laser meet certain operating parameter requirements, e.g., energy/dose stability of 0.3% for 30 laser system output light pulses in a burst of pulses from between 1500 and 1875 Hz pulse repetition rate operation and 0.3% over a period of about 16 ms) from 1875 to 4000 Hz pulse repetition rate operation. Such a dose stability requirement expresses, e.g., the required accuracy in the integrated output over some defined time window and/or defined number of pulses, e.g., as an extension from prior applicant's assignee's single chamber laser systems, e.g., ELS 6XXX or 7XXX laser systems, i.e., changing from a 5 mJ laser to a 10 mJ-15 mJ plus system, and a selected minimum number of pulses within the window required to meet any dose stability requirement. The window size for the dose specification may be constant, e.g., at 30 pulses from 1500 Hz to 1875 Hz, and subsequently, e.g., may increase linearly with pulse rate to 64 pulses at 4 kHz, with the implication that, e.g., (a) a trapezoidal dose window may be used and (b) 99.7% compliance of worst overall windows (max and min) over 1000 bursts may be required.

Simultaneously, such a control system may have to meet certain timing requirements, in order to, e.g., operate properly under an external trigger signal control, e.g., upon receiving a trigger signal from an integrated circuit lithography scanner, namely, e.g., Time from External Trigger to Light Out of between about 100 and 150 μs, with specified short term jitter, e.g., of around ±0.1 msec, and laser to laser variation in jitter of around ±1 msec, and with a long term jitter variation, e.g., 1 month drift, on the order of around ±10-50 nsec and a Time from Light Out to Sync Out on the order of from about −500 ns to 100 ns, with, e.g., a Short Term:drift/jitter of about ±10 nsec and a longer term drift, e.g., over chamber life: of about ±10 nsec. It also may be required, e.g., to meet certain other timing requirements, e.g. for a firing control panel ("FCP"), e.g., (1) an energy feed forward computation window (the time from when a pulse trigger is received to when the command to the resonant charger (RC) must be written to the fire control circuit (FCC)) on the order of around 20 μs, (2) a ("CSC") feed forward computation window (the time from when a pulse trigger is received to when the trigger delays for the timing and energy module (TEM) must be written to the FCC) of on the order of around 75 μs, (3) an energy feedback computation window (the time from when energy data received from the TEM is read from the FCC to when the RC voltage must be written to the FCC) of around 200 μs, and (4) a CSC feed forward computation window (the time from when timing data received from the TEM is read from the FCC to when the trigger delays for the TEM must be written to the FCC) of around 180 μs.

An exemplary system architecture may be as illustrated in FIG. 1, showing an illustrative laser timing and energy control system 20, which may, e.g., illustrate the relationship between an Energy and Timing Controller 22 and other elements of the laser timing and energy control system 20. The energy and timing controller 22 may comprise software resident on a Fire Control Processor (FCP) (not shown) of which the laser timing and energy control system 20 may be a part. The energy and timing controller 22 can communicate with the rest of the sub-systems in the timing and energy control system 20 through a Fire Control Circuit (FCC) 24. The FCC 24 may communicate with a timing and energy metrology module ("TEM") 26, a resonant charger ("RC") 28, and a customer interface 32.

The FCC 24 may, e.g., send MO and PA delay commands from the energy and timing controller 20 to the TEM 26 over the communication line 44. The TEM 26, e.g., may further send MO and PA commutator triggers to a pulse power system 30 over communication line 36, e.g., to initiate the discharge of a charging capacitor (not shown) through a solid state switching element (not shown) in the solid state pulse power module ("SSPPM") 30. The respective triggers creating the eventual gas discharge due to electrical energy provided to a respective pair of electrodes through a lasing gas medium between the electrodes in each of the respective MO and PA. This may, e.g., be after a relatively identical time delay for the electrical energy to transverse the pulse compression and transformation elements (not shown) in the SSPPM 30 for each of the respective MO and PA.

The MO and PA delay commands on line 44 can be used to indicate to the TEM 26 how long after a reference trigger, e.g., trigger 34 from a customer interface 32 to issue the respective triggers to the respective, e.g., MO and PA SSPPMs 30 on line 36. The pulse power system(s) 30 (there may be one for each of the, e.g., MO and PA) may in turn transmit back to the TEM 26 the MO and PA $V_{cp}$ waveforms on line 38. Such wave forms may be used by the TEM 26 to compute an MO firing time and a PA firing time, e.g., when the voltage on the peaking capacitor $V_{cp}$ connected across the electrodes in the respective one of the, e.g., MO and PA, e.g., crosses zero, and also, therefore, indicative of the respective time of the initiation of the discharge through the lasing gas medium in the respective one of the MO and PA. The TEM 26 can measure the respective zero crossings of the MO and PA $V_{cp}$ waveforms, e.g., relative to the reference trigger and can transmit this information back to the FCC on line 42 along with, e.g., energy data gathered from, e.g., one or more Photo Diode Modules (PDM's) 50. The FCC can also relay a voltage command received from the Energy and Timing Controller on line 52 to the Resonant Charger 28 over line 40 (which may be two RCs 28, one for each pulse power system module 30 if there are two, e.g., one for the MO and one for the PA). The FCC may also compute a pulse intervals (time between successive triggers on line 36 and provide this to the energy and timing controller 22 over line 52).

Figure 2:
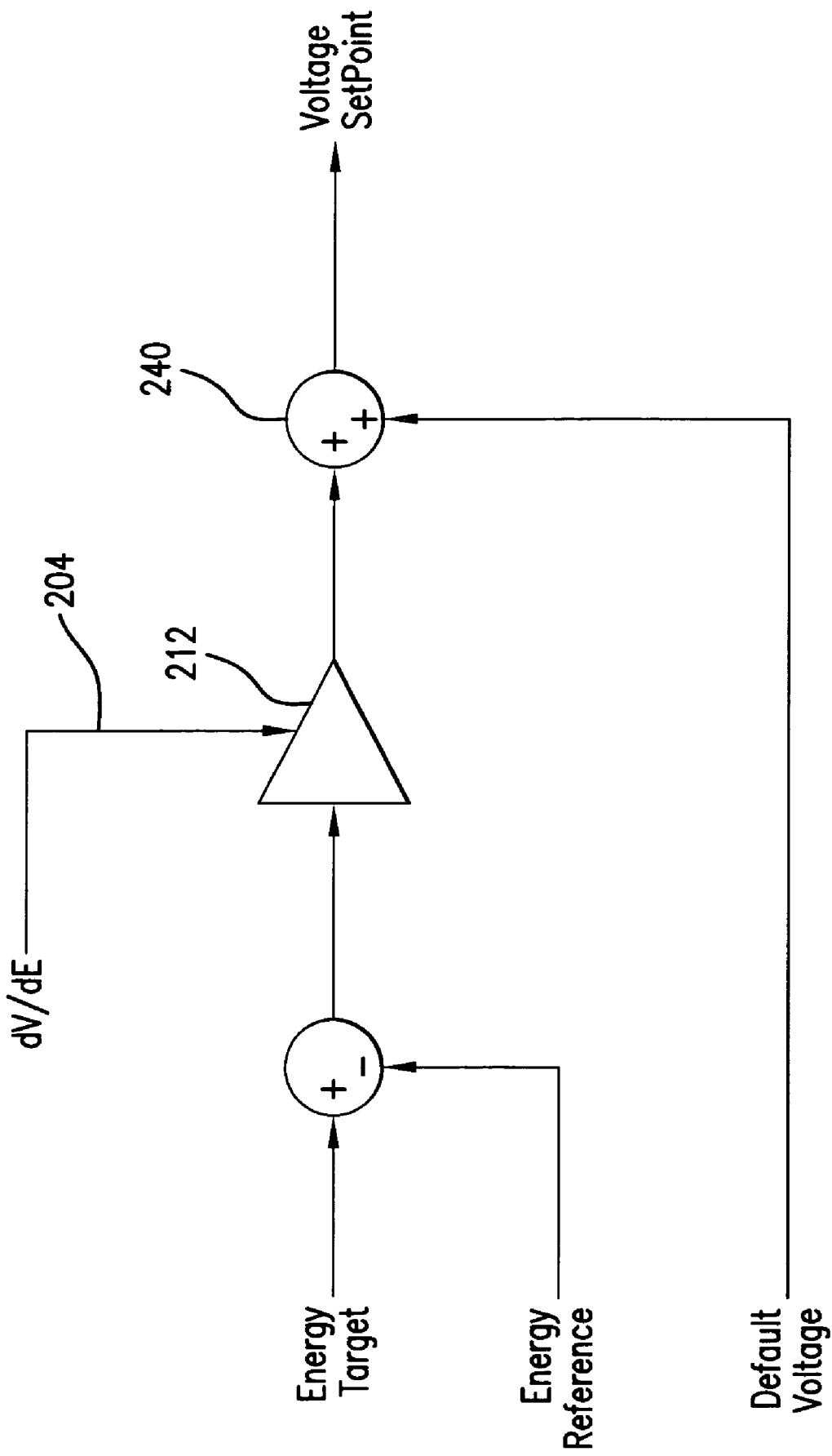
FIG. 2 shows a modified version of a portion of the controller of FIG. 4.

A sequence of steps may be executed by the energy and timing controller 22, e.g., as illustrated in FIG. 2, to implement energy and timing algorithms. The energy and timing controller may, e.g., nm in response to the occurrence of certain events, e.g., either of two events, (1) a trigger pulse arrives from the customer interface 32, through the FCC 24, or (2) an energy mode or target voltage/energy is changed. As illustrated in FIG. 2, e.g., a firing sequence for the fire control processor circuit 24. The process may start, e.g., with the reception of a trigger pulse on line 34. An interrupt service routine indicated by box 60 may process the trigger pulse 34 and may retrieve the time since the last trigger pulse which may be stored in a memory in the FCC, and may also call the resonant charger device manager 62 in the resonant charger 28 with this information. The device manager 62 may use the period between triggers to lookup a voltage from a voltage lookup table. The voltage lookup table may be generated by the feed forward portion of the algorithm. Contributions to voltage due to an energy servo, an energy target and an energy dither may then be added to this value in the FCC and the result, e.g., a command voltage $V_c$ may be transmitted to the resonant charger 28 over line 40 in the form of a voltage command for the resonant charger 28 to charge a charging capacitor $C_0$ in the respective SSPPM or the single SSPPM in order to achieve a selected V across the peaking capacitor $C_{cp}$ and across the electrodes. In the event that there are two RCs 28 two high voltage commands may be computed and transmitted, one for the MO and one for the PA.

The FCC 24 may need to have deferred the transmission of the voltage signal(s) to the resonant charger 28 until after the trigger pulse 34 has been received, in order, e.g., to enable the voltage commanded to be dependent on a factor related to the timing of the arrival of the trigger pulse 34, e.g., either an interburst interval or a pulse repetition rate. Such interval and/or rate may, e.g., affect temperature in the SSPPMs and thus the charging voltage needed to achieve a selected peaking capacitor voltage and, e.g., a desired laser output energy. This entire sequence may take place at the interrupt level, e.g., to ensure meeting a 20 μs deadline for the transfer of, e.g., a voltage command to the resonant charger to control the charging of, e.g., $C_0$.

After the voltage command is transmitted, the value transmitted can be used to apply a correction to the MO and PA trigger delays, which can then be transmitted to the TEM 26 after which the ISR 60 can exit. After the laser fires and the TEM 26 may send new energy and timing data 42 to the FCC 24, where an energy and timing task 80 may be brought active and an energy and timing SPG 82 unblocked. The task 80 may call the SPG 82 which may read this data, e.g., from a memory 84 and then transmit the relevant shot data 92 to a shot and judgment SPG 90. The SPG 82 may use the energy and timing data on line 42 to compute errors which may be used to adjust the internal state of the system in order to, e.g., reduce errors on successive shots. A new voltage lookup table 66, energy servo commands, energy targets and energy dither may be computed, e.g., by the energy and timing SPG and sent to the resonant charger device manager 64. Finally, new values for computing the MO and PA delays as a function of voltage may be sent to the TEM device manager 70, e.g., over line 101.

A sequence of events for an energy/voltage target or energy mode change may comprise (1) receiving a change command from a laser control processor "LCP") (not shown) by a fire control manager in the FCC 24, (2) sending the change to the energy and timing SPG 82. The SPG 82 may then call the RC device manager 64, e.g., over line 100, to change the appropriate value (either energy target, energy mode, or voltage command).

The energy and timing controller 22 may use selected algorithms to execute its logic. The algorithms may employ the concept of layering, whereby, e.g., the control may be applied to the system in layers. Each successive layer of control may be designed to correct problems not fixed by the previous layer(s) without reducing the effectiveness of the previous layer(s).

At the highest level of control there may be, e.g., two layers of control, e.g., timing control and energy control. Since the timing control may heavily and directly influence the efficiency of the laser, the timing control loop may be designated the primary control loop and closed first. The energy loop may then be designated the secondary control loop and closed on top of the timing loop. In order, e.g., to prevent a feedback interaction occuring between the energy and timing loops, features may be put into the timing controller to desensitize it to voltage changes.

The timing control loop may be designed with two objectives in mind, first to regulate the relative time between MO and PA firings, e.g., by regulating the time between Vcp crossings, $t_{VcpPA}-t_{VcpMO}$ and second to regulate the relative time between the TEM reference trigger and PA Vcp zero crossing.

Keeping the time between MO and PA firings close to an optimal target can, e.g., maximize the efficiency of the laser. Reducing jitter in this time can reduce energy variability and hence improve dose control. $V_{cp}$ zero crossings may be used instead of, e.g., fast photo diode threshold crossings because the $V_{cp}$ zero crossings tend to be less sensitive to fluctuations in signal amplitude.

In general, the goal may be to keep the difference between MO and PA Vcp crossings within, e.g., a nanosecond or so of a specified target (typically, e.g., 30-40 ns), e.g., 30 ns±2-3 ns.

The laser synch signal may be fired a fixed duration after the TEM 26 reference trigger, which may be fired a fixed duration after the customer trigger 34. Therefore, regulating the time from the reference trigger to the PA firing may serve to help the laser system meet trigger to light and light out to synch out requirements.

The timing controller may be arranged in four layers (1) a primary layer, to correct for voltage effects, (2) a secondary layer to adjust voltage compensation for temperature effects, (3) a tertiary layer to correct for pulse to pulse variability, and (4) a quaternary layer to adjust the dtMOPA (e.g., t+differential MO and PA firing times, e.g., $t_{VcpPA}-t_{VcpMO}$, i.e., the difference in the $V_{cp}$ zero crossings) target to compensate for drift in optimum.

Sources of variability in MO or PA triggers 36 to Vcp delay are, e.g., the delay times in the MO and PA commutators and compression heads in transferring the charge from $C_0$ to $C_p$, the charging capacitor to the peaking capacitor through, e.g., saturable magnetic elements that shorten the pulse length and a step up transformer. These delays can depend at least in part on the applied voltage applied from the RC 28 to the charging capacitor $C_0$ at the input to the commutator and compression head electrical circuits of the respective MO and PA SSPPM(s). Moreover, since these electrical circuits cannot be perfectly matched, the difference between the two also varies (by over 20 ns) with voltage. The primary layer of timing control compensates for this effect, e.g., by utilizing curve fits to the measured delay vs. charging voltage. Functions of the form:

$$\Delta t = \frac{\alpha}{V} + \beta + \gamma V \quad \text{(Eq. 1)}$$

(where Δt is that of the SSPPM) have been found to yield very good fits to the MO and PA delay curves. Curve fits using $\Delta t_{SSPPM}=\alpha/V+\beta+\gamma/V^2$ have been found to be actually slightly worse, with the trigger out to light out varying from around 6.4 μs at 800 volts to 5.1 μs at 1200 volts and with the PA tending to be about 50 ns faster at each point along the curve, but actually varying from about 66 ns at 800 volts and peaking at about 68 ns at about 850 volts and then decreasing to about 42 ns at 1200 volts. The primary layer for the timing controller may therefore be a simple algebraic compensation for these voltage effects.

Figure 3:
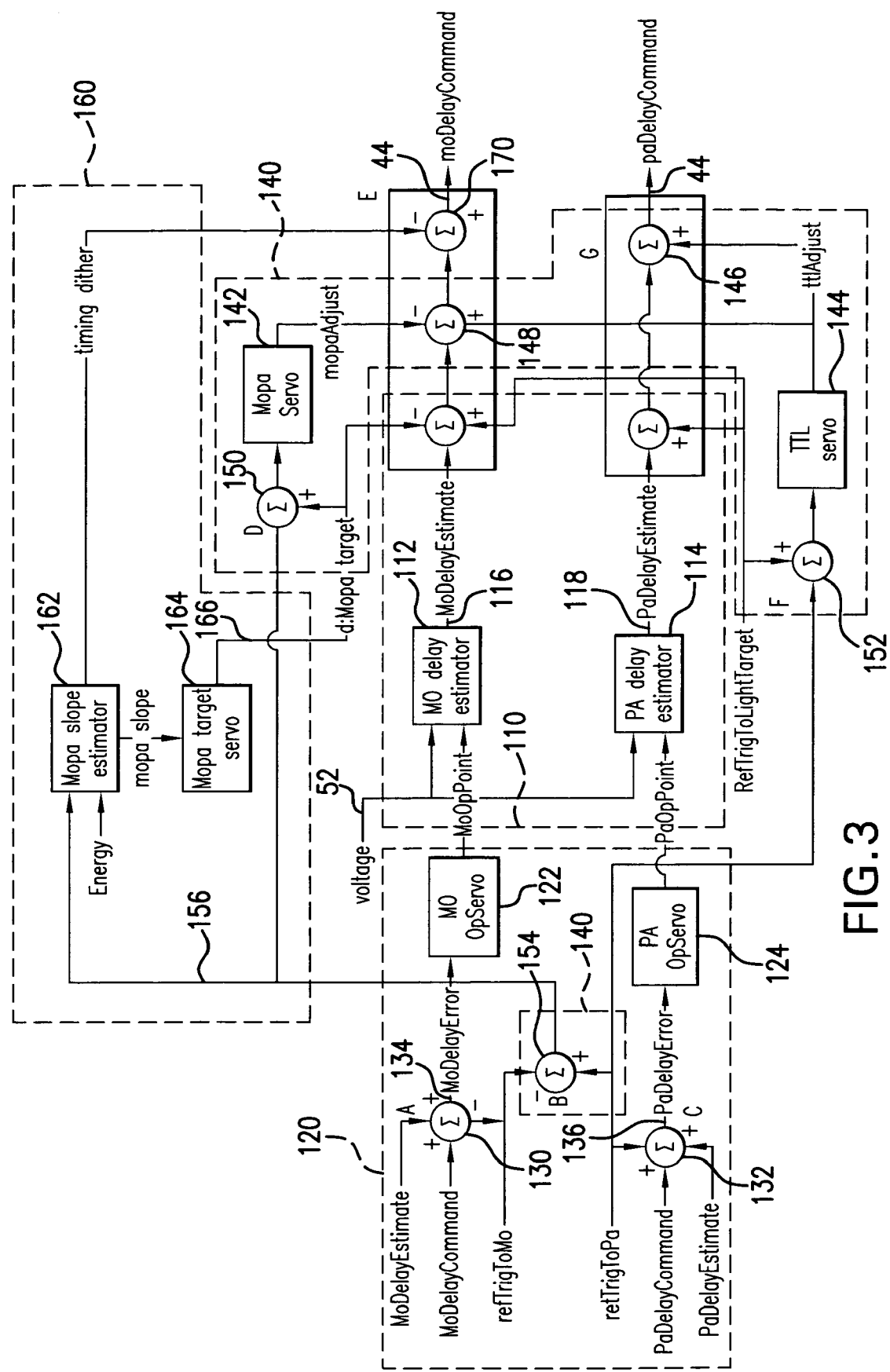
FIG. 3 shows illustratively in schematic block diagram form an example of a timing controller.

FIG. 3 shows a schematic illustration of an example of a primary timing controller 110, which may be in the FCC 24. The primary timing controller 110 may take the voltage command on line 52 from the timing and energy controller 22 and passes it through MO and PA delay estimator blocks 112, 114 which can implement Eq. 1, e.g., to obtain estimates of the MO and PA SSPPM commutator delays and then may use these values to compute MO and PA delay command estimates 44 for use by the TEM 26 as illustrated schematically in FIG. 1.

A secondary layer 120 of the timing controller 22 may compensate the MO and PA delay estimates, e.g., for temperature effects. As the laser system operates, the MO and PA SSPPMs heat up. This can, e.g., change the electrical properties, e.g., in the commutators which can affect the time delay, i.e. generally slowing the time from trigger to light out as the temperature rises and still decreasing in delay as voltage rises. Thus, as the magnetic circuits, e.g., in the SSPPM commutators heat up, the MO and PA delay estimates can become more and more inaccurate.

However, the delay curves are also all of a very similar form and, in fact, all collapse to a single curve when the x and y axes are appropriately shifted, so that an equation of the form:

$$\Delta t = \frac{\alpha}{(V+\delta(T)v)} + (\beta + \delta(T)b) + \gamma(V + \delta(T)v) \quad \text{(Eq. 2)}$$

where δ(T) is a temperature dependent operating point, can be used as a good approximation of the $\Delta t_{SSPPM}$ delay across its entire operating temperature range. If, e.g., an estimate of the temperature dependent SSPPM voltage operating point δ were available in real time, then, e.g., the delay estimate could be made to track changes in temperature. This tracking may be accomplished by measuring the difference between the measured delay and a predicted delay and then adjusting the voltage operating point to reduce this error on every shot.

$$MoOpPoint[k] = MoOpPoint[k-1] + \\ MoOpPointServoGain* \\ MoDelayError[k-1] \quad \text{(Eq. 3)}$$

and $$PaOpPoint[k] = PaOpPoint[k-1] + \\ PaOpPointServoGain* \\ PaDelayError[k-1] \quad \text{(Eq. 4)}$$

Where MoOpPoint and PaOpPoint take the place of δ in Eq. 2. Adding this secondary layer 120 to the primary layer 110 as shown in FIG. 3 can comprise an MO Op Servo 122 and a PA Op Servo 124. The MO Op Servo can perform the computation according to Eq. 3 to determine an MO Op Point [for shot k] from an MO Op point for shot [k−1] and an MO Delay Error [for shot k−1] times an MO Op servo gain, and similarly the PA Op Servo 124 can determine a PA Op Point [for a shot k]. The MO Delay Error and PA Delay Error may be determined by summing, in respective summers 130, 132, which may respectively add a MO Delay Estimate to an MO Delay command and subtract a reference Trigger to MO signal and the same for the PA.

A useful effect of adding the secondary layer control 120 to the primary layer 110 in the energy and timing controller 22 is that the same set of coefficients can be used for the MO and PA delay estimators. Applicants believe that using identical coefficients for different commutators results in MOPA timing errors of less than about 5 ns for voltage changes as large as about 50 V.

The secondary layer may be utilized to respond to slow temperature variations. It may also be desirable to have an additional layer of control, e.g., to handle pulse to pulse variability. The tertiary control layer 140 can add two more servos, MopaServo 142 and TtlServo 144, and three summers 150, 152 and 154 to the design. The purpose of these servos 142, 144 may be to reduce dtMOPA and trigger to light timing errors as quickly as possible. The MopaServo 142 may act to reduce the difference between the relative time between MO and PA Vcp zero crossings and a target.

$$\text{mopaError=dtMopaTarget-(refTrigToPaVcp-refTrig-ToMoVcp)} \qquad \text{Eq. 5}$$

$$\text{mopaAdjust}[k]=\text{mopaAdjust}[k-1]+\text{gain}^*\text{mopaError}[k-1] \qquad \text{Eq. 6}$$

where refTrigtoPAVcp and refTrigtoMOVcp are indications, by use, e.g., of the respective MOVcp and PAvcp zero crossings of the time from the reference trigger to light out from the respective MO and PA.

In order to reduce large errors as quickly as possible, the gain may be switched to a higher value for larger errors, e.g., if abs(mopaError)>ETMopaServoThreshold, gain=ETMopaServoGainHigh else gain=ETMopaServoGainLow The TTL servo may act to keep the time between the reference trigger and PA discharge as close to the target as possible, e.g., $$\text{ttlError=refTrigToLightTarget-refTrigToPaVcp} \qquad \text{Eq. 7}$$

$$\text{ttlAdjust}[k]=\text{ttlAdjust}[k-1]+\text{ETTtlServoGainLow}^*\text{ttlError}[k-1] \qquad \text{Eq. 8}$$

where refTrigtoLight Target is the time between light out of the PA and a reference trigger and refTrigtoMOVcp is an indications, by use, e.g., of the MOVcp zero crossing of the time from the reference trigger to light out from the respective MO and PA.

As conditions vary, the optimal dtMOPA target may drift, and the control system may accommodate this by, e.g., continually estimating an optimal timing value. The optimal timing value may be computed in an optimal timing value unit 160 in the controller 22, e.g., in two steps. First, a MOPA slope estimator 162 may be used to estimate the sensitivity of laser output energy to MOPA timing difference. The estimator 160 may output a timing dithering value which may be subtracted from the Mo delay command. The dither signal may be a sine wave where the period, interval between periods, i.e., the interval between dithers, holdoff, i.e., the number of shots into a burst before dither is started and amplitude may be configurables, i.e., fixed values stored in the software (which may also be updated from time to time). The estimator 162 may maintains two state variables, e.g., inputCorrelation and outputCorrelation. When a period of dither completes, the inputCorrelation and outputCorrelation may be updated in the following fashion:

$$\text{inputCorrelation} = \text{inputCorrelation} \ (1-g) + \qquad \text{Eq. 9}$$
$$g \sum_{i=0}^{N-1} \text{mopa} \ [k-i]$$
$$\text{dither} \ [k-i]$$

-continued
$$\text{outputCorrelation} = \text{outputCorrelation} \ (1-g) + \qquad \text{Eq. 10}$$
$$g \sum_{i=0}^{N-1} \text{energy} \ [k-i]$$
$$\text{dither} \ [k-i]$$

where g may be a configurable gain, mopa[k−i], energy[k−i], and dither[k−i] may be the $i^{th}$ previous shot MOPA difference timing (dtMOPa, i.e., t), shutter energy measurement and dither, respectively. The value, N, may be the dither period.

The MOPA slope may be calculated as the ratio of the two correlations:

$$\text{mopa slope} = \text{outputCorrelation}/\text{inputCorrelation} \qquad \text{Eq. 10a}$$

The MOPA target servo 164 may act to drive the mopa slope to some selected value, e.g., zero. The dtMOPA timing servo 142 may be run, e.g., whenever the MOPA slope estimator updates, e.g., according to the following:

$$\text{DtMopaTarget}[k]=\text{DtMopaTarget}[k-1]+\text{mopa slope}[k]^*\text{ETMopaTargetServoGainLow} \qquad \text{Eq. 11}$$

The MOPA difference time target, i.e., $t_0$ (DtMopaTarget 166) may constitute a state variable in the FCP which may be persisted across power cycles. For example, when the laser system drops to standby, the current value of the MOPA target may be written back to a data registry (not shown?). When the laser is again booted, this MOPA target can be available to be read from the registry.

Figure 4:
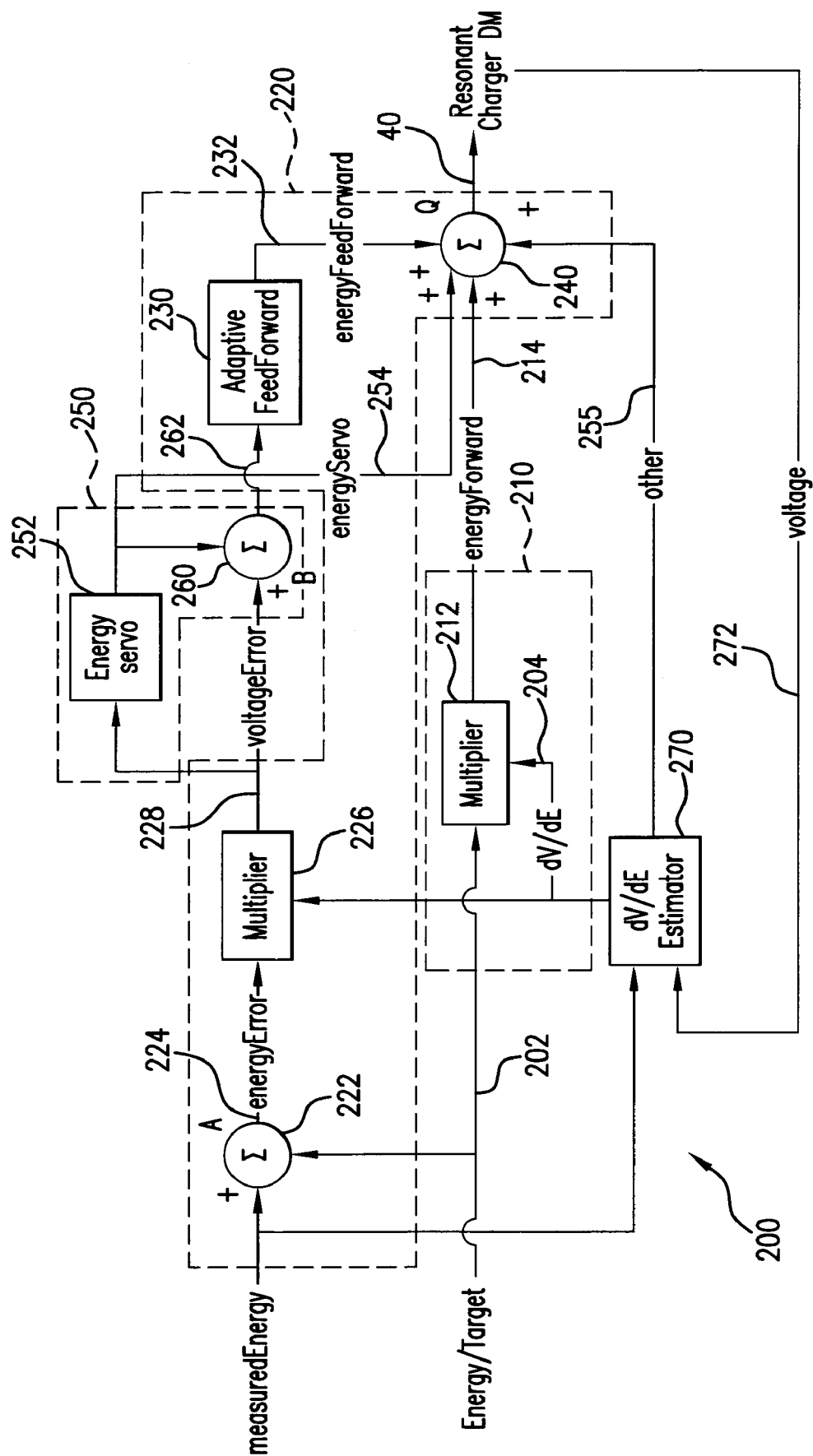
FIG. 4 illustratively shows in schematic block diagram form an example of an energy controller.

An energy controller 200, as illustrated schematically in block diagram form in FIG. 4, within the timing and energy controller 22 may be constructed to meet a single objective, e.g., to keep the laser output system output light beam energy as close to a specified target value as possible, that is to say maintaining an energy level in each pulse of the laser system output light beam pulses delivered by the laser system at the pulse repetition rate for the laser system operation. In most cases, the objective can be implemented by, e.g., minimizing a moving average energy, i.e., dose. In some modes however, more emphasis may be placed on, e.g., minimizing a moving standard deviation, i.e., sigma.

As illustratively shown in FIG. 4 the energy controller 200 may be arranged, e.g., in four layers, e.g., the layers (1) primary, which may respond to changes in energy target, (2) secondary, to correct for drift and energy transients, (3) tertiary, to regulate pulse to pulse variability and (4) quaternary, to estimate the derivative of energy with respect to voltage.

The energy control system 200 may support several energy control modes, e.g., the modes (1) output energy control: internal sigma, internal sigma ODC, internal dose, internal dose ODC, external sigma, external sigma ODC, external dose, external dose ODC, external voltage or constant voltage (LEVELEnable=true); (2) dose control mode: internal dose, internal dose ODC, external dose, external dose ODC; (3) sigma control mode: internal sigma, internal sigma ODC, external sigma, external sigma ODC; (4) internal energy mode: internal dose, internal dose ODC, internal sigma, internal sigma ODC, external voltage or constant voltage (LEVELEnable=true); (5) external energy mode: external dose, external dose ODC, external sigma, external sigma ODC; (6) ODC mode: internal dose ODC, external dose ODC, internal sigma ODC, external sigma ODC; (7) non ODC mode: internal dose, external dose, internal sigma, external sigma; (8) voltage control: constant high voltage or external voltage (LEVELEnable=false); (9) MO control: MO energy control mode. Such control modes may function to (1) constant voltage in order, e.g., to output a fixed voltage (which may be set by a configurable), (2) constant internal dose, e.g., to regulate the voltage so that shutter energy (laser output light pulse beam energy at the laser system optical output—the shutter) is kept constant, wherein, e.g., control gains may be set to minimize the moving average of the energy error, (3) constant internal sigma, e.g., to regulate the voltage so that the shutter energy is kept constant, wherein, e.g., control gains may be set to place more emphasis on moving standard deviation of energy error, (4) constant external dose, which may regulate the voltage so that energy at the customer energy sensor is kept constant, wherein, e.g., control gains may be set to minimize the moving average of the energy error, (5) constant internal sigma, which may regulate the voltage so that energy at the customer energy sensor is kept constant, whereby, e.g., control gains may be set to place more emphasis on moving standard deviation of energy error, and (6) external voltage, e.g., to command an output voltage as requested by the customer (e.g., a signal received from an integrated circuit fabrication photolithography scanner), e.g., on a shot by shot basis.

The primary layer energy control layer 210 may be arranged for energy target agility and may, e.g., simply scale an energy target signal 202 by an estimate of the inverse of the derivative of output energy with respect to voltage (dV/dE) on signal line 204 in a multiplier 212 to provide an energy Forward feed forward signal 214. This can, e.g., quickly adjust the commanded voltage level on line 40 to accommodate for changes in energy target 202. In, e.g., constant energy modes, the dV/dE estimate 204 and energy target 202 signals may be the estimates and targets for the shutter/external energy.

As shown schematically and in block diagram form in FIG. 2, the primary layer 210 of energy control may be implemented with an energy target 202 having subtracted from it an energy reference 202a, which may be a typical value for the energy target 202, e.g., the middle of some selected range of energy. The result may then be multiplied by dV/dE, e.g., in an amplifier 212 and that result summed with a default voltage 206, e.g., to get a voltage point 40.

The secondary layer of energy control 220 may, e.g., account for energy transient and drift, and may be arranged as an adaptive feed forward system. The secondary layer 220 may serve to correct for the DC error inherent in the primary control law, e.g., where the energy vs. voltage curve has a non-zero y-axis intercept). The secondary layer 220 may also vary the voltage command for the first few pulses, e.g., in a burst in order to correct for energy transients, e.g., burst correlated errors. The secondary layer 220 may also be applied in constant output energy modes. In MO energy control feed forward may always be set to zero.

In the secondary layer, the energy target 202 may be subtracted from a measured energy signal 52 in a summer 222 to produce an energy error signal 224, e.g., whenever new measurements are available, e.g., according to the following equation:

energyError[k]=measuredEnergy[k]−energyTarget[k]  Eq. 12

This energy error signal 224 may be scaled by dV/dE signal 204 in a multiplier 226 to convert it to an equivalent voltage error signal 228 which may then be used to adjust the voltage waveform applied by an adaptive feed forward circuit 230 to provide and energy feed forward signal 232 to a summer 240, which also receives the energyForward signal 214 from the multiplier 212 in the primary layer controller 210. The following equations may be used:

voltageError[k]=dvde[k]*energyError[k]  Eq. 13

F[i,k]=F[i−1,k]+voltage error[k]*$K_{FF}$  Eq. 14

Where Eq. 14 may be used for energy feed forward updates to the voltages, e.g., for a burst based upon errors, e.g., on the previous burst, and where F[i,k] is the energy feed forward voltage applied on the $k^{th}$ shot of the $i^{th}$ burst, and $K_{FF}$ is an adaptation gain. A special case may occur, e.g., when the shot just fired exceeds ETEnergyFFInversionSize, in which case, the last value may simply keep repeating until a new burst starts.

Figure 7:
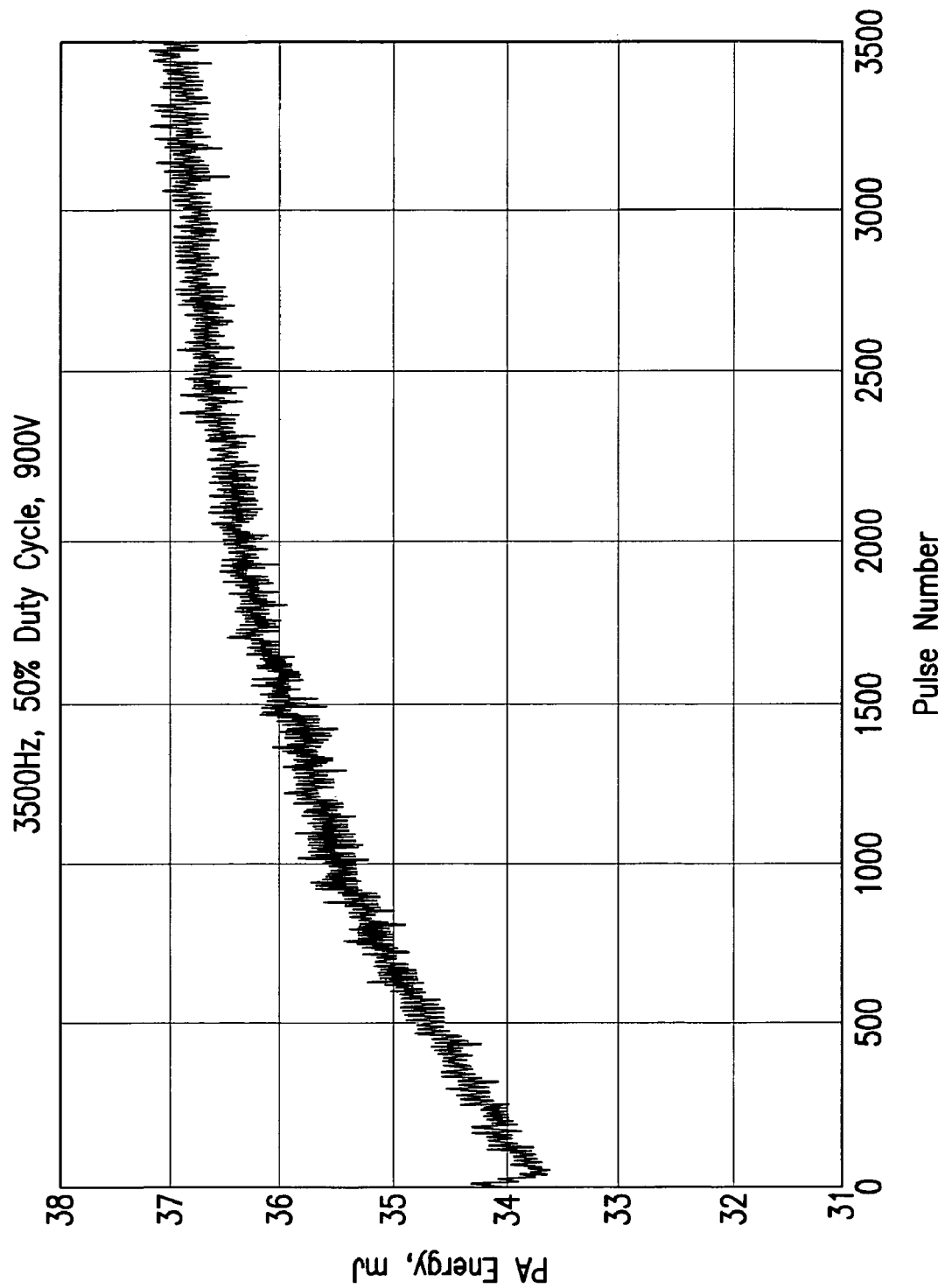
FIG. 7 illustrates an energy response for a laser system firing in a constant voltage mode.

A phenomenon which has been noted to occur in the laser system is the effect of firing the laser on efficiency. FIG. 7 illustrates a typical response for a laser system of the kind referenced above and firing, e.g., in a constant voltage mode. As the laser continues to fire, the efficiency in this case increases. If, e.g., the laser were to stop firing for a sufficient period of time, the efficiency could return to a value similar to what it was at the start of the burst, as illustrated in FIG. 7. For shorter off times, the laser system could return to some value greater than the efficiency at the start of the burst as illustrated.

The implication of what is illustrated by example in FIG. 7 is that, e.g., the required DC offset for the start of a burst can depend on the length (and rep rate) of the previous burst and the interburst interval. Often, while the burst length and rep rate do not tend to vary much, several inter burst intervals may be used at different times. For example, one value may occur when changing between dies on a wafer being exposed by the light from the laser system, e.g., in a scanner used for integrated circuit manufacturing. Another may occur between wafers and still a third could occur between cassettes holding a number of wafers. It may be important, therefore, to make the initial voltage applied on a burst dependent on at least in part the interburst interval or duty cycle over some pre-defined window size, or both. Also, after the first pulse in a burst has just been fired, the system may store the corresponding voltage and may, e.g., add it to all succeeding voltages within the burst. This effectively adds a DC offset associated with the first pulse correction to all pulses in the burst:

The desired behavior can be, e.g., that at fixed burst intervals, Eq. 14 applies. When the burst interval changes, however, a, e.g., different set of bins may be used.

F[i,k]=$F_0$[i,b] k=1

F[i,k]=F[i,1]+F'[i,k] k>1  Eq. 14a where i is the burst number, k is the shot number and b is, e.g., a selectable the burst interval bin. Typically, there could be, e.g., one bin used for burst intervals less than 0.35 seconds, another for 0.35 to 4.5 seconds and a third for intervals greater than 4.5 seconds.

Update logic such as the following could be used:

$F_0$[i+1,b]=$F_0$[i+1,b]−$e_v$[i,k]$K_{FF}$=$F_0$[i+1,b]+$dF_0$[i,k]
k=1

F'[i+1,k]=F'[i,k]−$e_v$[i,k]$K_{FF}$−$dF_0$[i,k] k>1  Eq. 14b where $e_v$[i,k] is a voltage error. When b remains constant, Eq. 14b reverts to Equation 14 as desired.

Figure 8:
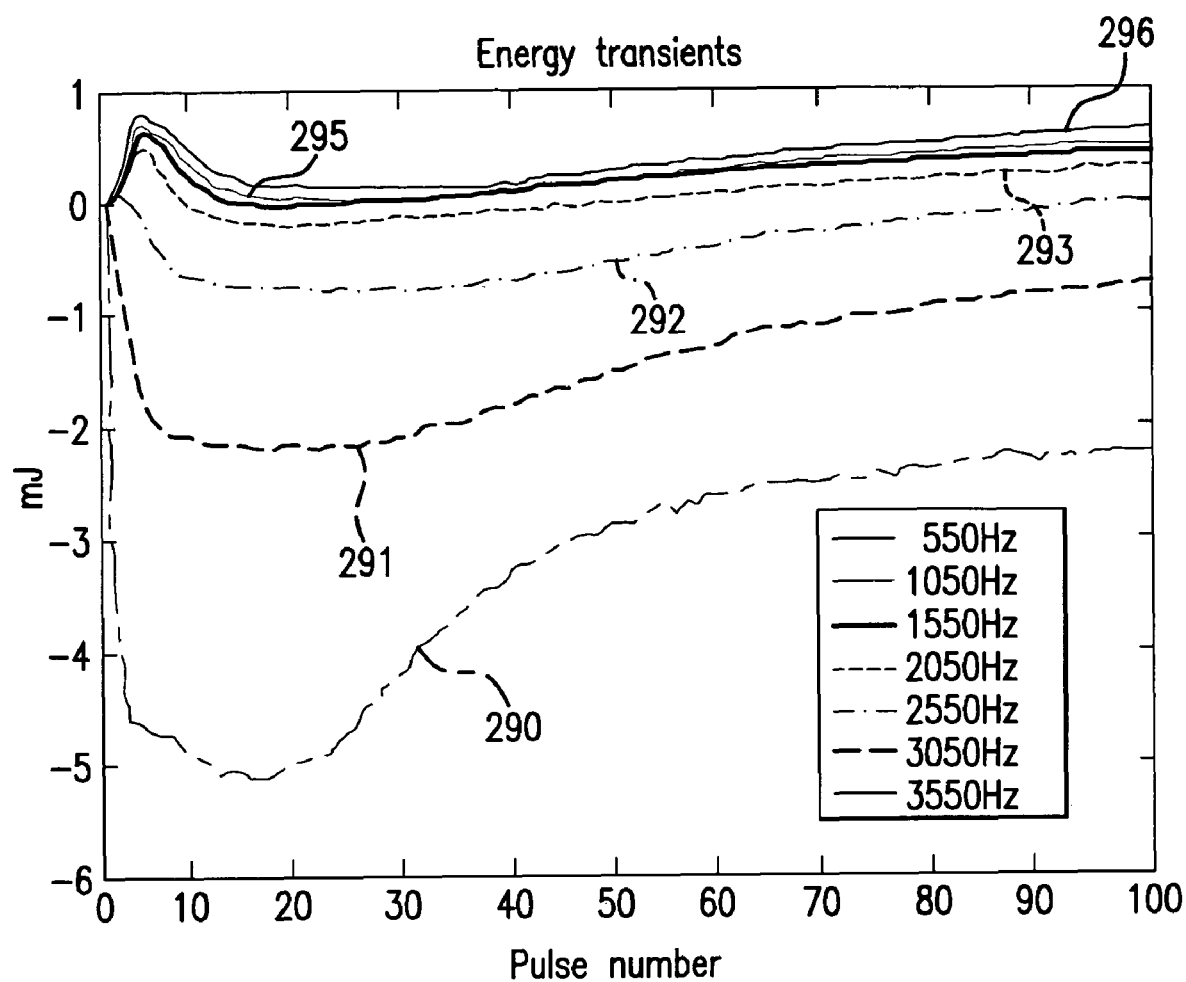
FIG. 8 illustrates laser system operation energy data.

Another effect which may be incorporated is the effect of pulse repetition rate on the burst transient. FIG. 8 illustrates energy data averaged over several bursts for a range of pulse repetition rates, 290 550 Hz, 291 1050 Hz, 292 1550 Hz, 293 2050 Hz, 294 2550 Hz, 295 3050 Hz and 296 3550 Hz. As can be seen a transient generally at the front of the burst of pulses changes radically as the rep rate is changed. This behavior may be accommodated, e.g., by including a separate inversion waveform for different ranges of rep rates, e.g., for the first pulse in a burst energyFeedForward=firstPulseOutput=firstPulseWaveform(interval)

and for subsequent pulses energyFeedForward=waveform(pulseNumber,rep rate)+firstOutput     Eq. 14c In certain cases, such as when the voltage hits the rail, feed forward could continue to adapt. The state variables in the feed forward algorithm (firstpulsewaveform and waveform) could continue to grow without bounds in a phenomenon known as servo windup. To limit this, logic may be implemented in the feed forward algorithm. The following logic may be applied after 14b:

$F_0[i+1,b] \rightarrow sat(F_0[i+1,b], F_{min}, F_{max})$   k=1

$F'[i+1,k] \rightarrow sat(F'[i+1,k], F_{min-F0}[i,b], F_{max}-F_0[i,b])$
k>1     Eq. 14d where the operator sat(a,b,c) is the saturation operator:

$$sat(a, b, c) = \begin{cases} b & a < b \\ a & b \le a \le c \\ c & a > c \end{cases}$$     Eq. 14e The tertiary energy control layer 250 may be used to account for, e.g., pulse to pulse variability and may, e.g., be in the form of an energy servo 252. The energy servo 252 may be used, e.g., to make corrections to the voltage on a pulse by pulse basis. The energy servo may receive the voltage error signal 228 and using this voltage error signal 228 may serve to provide correction signals 254 that may be added directly to the applied voltage output signal 40 in the summer 240 and may also, e.g., for a part of the input to the voltageError signal 228, e.g., by being subtracted from the voltageError signal 228 (negative summed) in a summer 260 for input 262 into the adaptive feed forward unit 230 for the formation of the EnergyFeedForward signal 232 output of the unit 230. This can be utilized, e.g., to prevent the energy servo 252 from interfering with the behavior of the adaptive feed forward unit 230, whereby, e.g., the error signal 262 used for adaptive feed forward unit 230 is the voltage error signal 228 less the energy servo correction signal 254, thus, e.g., making the energy servo signal 254 unobservable to the adaptive feed forward unit 230, e.g., in performing its algorithm. The adaptError signal 262 may then be given, e.g., by the equation:

adaptError=voltageError−energyServo     Eq. 15

The energy servo 252 may employ integral, integral-squared feedback:

$u[k+1]=u[k]-K_1 e_v[k]$ $x[k+1]=-u[k+1]$   K=0

$u[k+1]=2u[k]+2x[k]-K_1 e_v[k]$ $x[k+1]=-u[k]+(K_1-K_2)e_v[k]$   $K_2=0$     Eq. 15a where $K_1$ is the integral gain, $K_2$ is the I-squared gain, u[k] is the servo output, x[k] is an additional servo state, and $e_v[k]$ is a voltage error.

Figure 5:
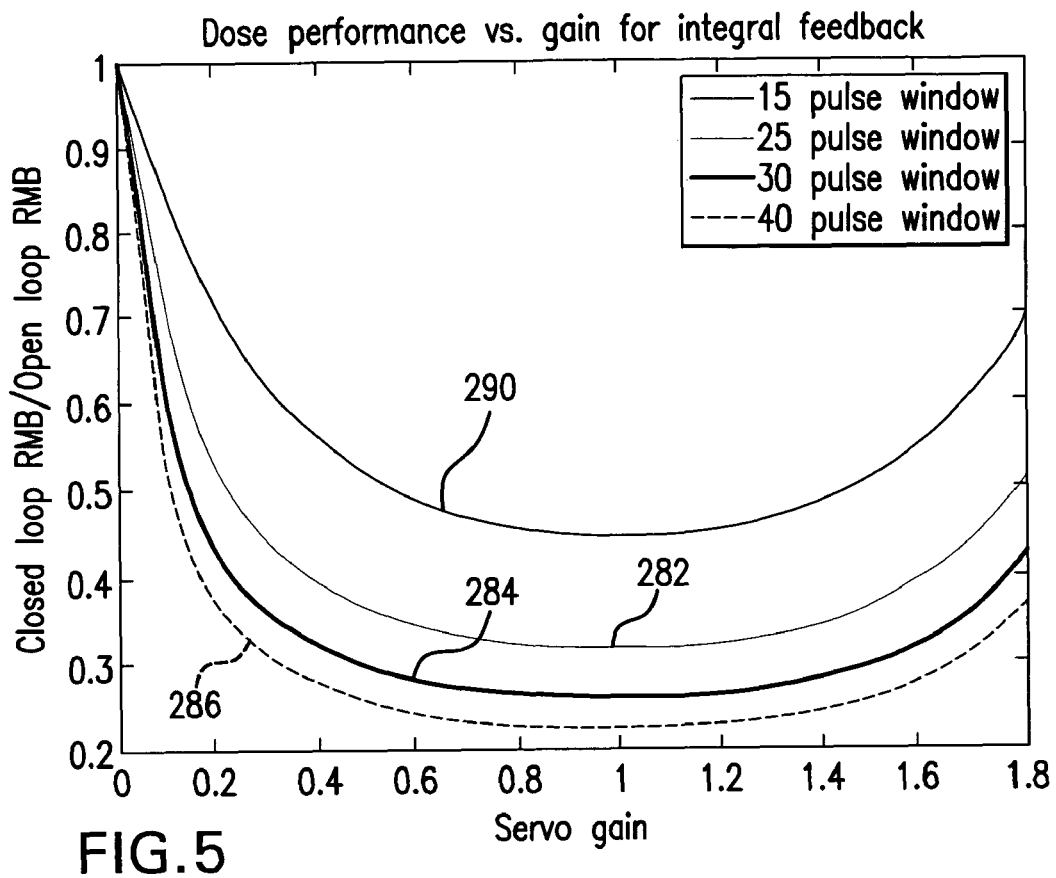
FIG. 5 is illustrative of gain optimization for an energy servo according to aspects of an embodiment of the present invention.

In, e.g., constant output energy modes, the energy servo 252 may be reset, e.g., on the first pulse of every burst. This may be utilized to ensure that the DC offset at the end of one burst does not influence the voltage applied on the first pulse of the next burst. In MO energy control or if feed forward is disabled, the servo may not get reset on the first pulse of the burst. When the state is reset, both state variables may be set to zero. Like feed forward, the energy servo must also be protected against windup. After applying, e.g., equation 15a, the following logic may also be applied:

$$\begin{array}{l} u[k+1] \rightarrow u_{max} \\ x[k+1] \rightarrow -u_{max} \end{array} u[k+1] > u_{max}$$

$$\begin{array}{l} u[k+1] \rightarrow u_{min} \\ x[k+1] \rightarrow -u_{min} \end{array} u[k+1] < u_{min}$$     Eq. 15b Several versions, e.g., three versions of the energy servo 252 may be are provided. One may be, e.g., intended to minimize dose errors (used in internal and external dose control modes), another may be, e.g., intended to minimize energy sigma (used in internal and external sigma control modes), and a third may be, e.g., intended for MO energy control. FIG. 5 illustrates, e.g., the gain optimization for the energy servo for dose control. The plot shows by way of example values for the ratio of open and closed loop response, e.g., for a Gaussian white noise disturbance (a reasonable approximation for the energy error in this case). Optimal reduction is attained for all window sizes with a controller gain of unity. The pulse window sizes represented are 280 10 pulse window, 282 20 pulse window, 284 thirty pulse window and 286 40 pulse window.

Figure 6:
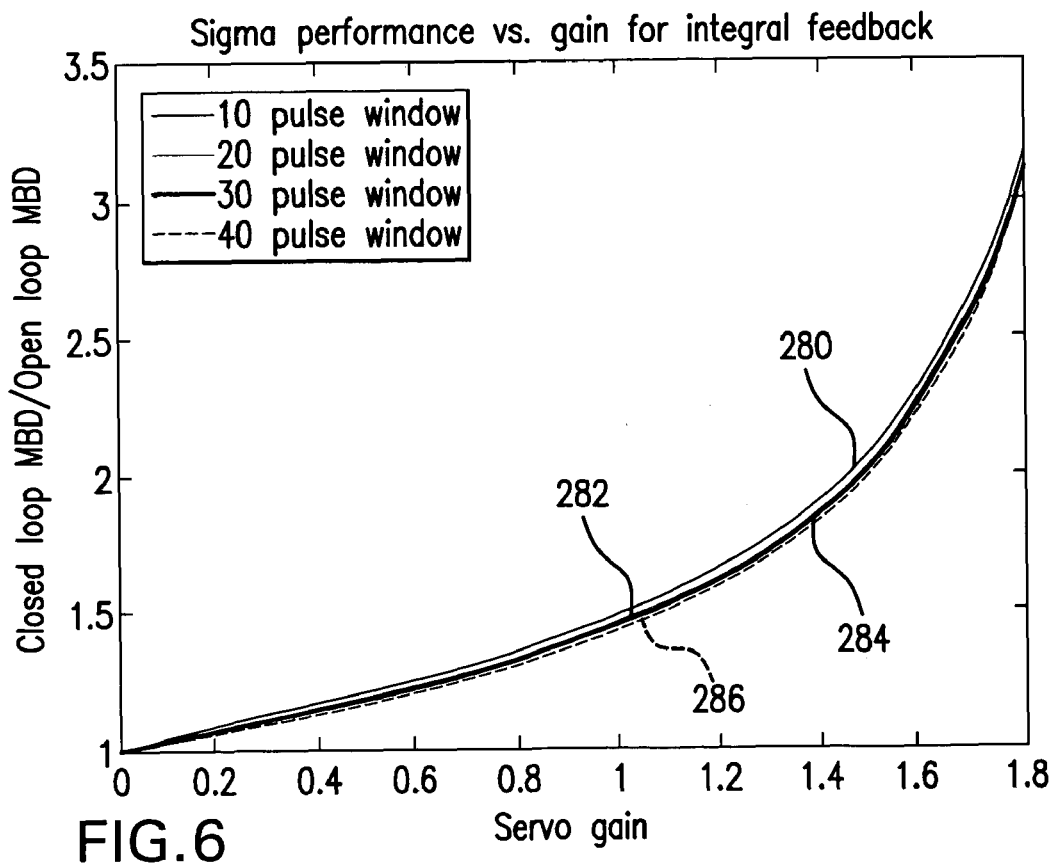
FIG. 6 is also illustrative of gain optimization.

For energy sigma control, more emphasis may be placed at higher frequencies. FIG. 6 illustrates by way of example the expected value of closed loop MSD over expected values of open loop MSD for broad band disturbances. Optimal gain may be at zero. FIG. 6 illustrates the ratio of open and closed loop sigma for Gaussian white noise disturbances. Analysis indicates that any gain will tend to degrade sigma for any window size. In practice, some gain should be used in order for the servo to take out drift, but in general, the gains for energy sigma should be much lower than those for energy dose control.

A quaternary layer, as illustrated for example in FIG. 4, of energy control may be dV/dE estimation. The purpose of this layer can be, e.g., to determine the requisite amount of voltage, e.g., to be applied to the system, e.g., in order to produce a desired change in energy, e.g., either at the output (shutter on the output of the entire laser system) or the MO output energy sensor. In single chambered controllers, e.g., for the 7XXX, dE/dV was estimated instead. For a multi-chamber system, e.g., a MOPA system, the inverse may be used, e.g., in order to eliminate several divisions. The dV/dE estimate 204 may then be inverted before writing to the shot record as dE/dV, e.g., in order to give the customer data in the form with which the customer is familiar with dealing.

The estimator(s) may work in the following fashion. A dither signal 255 may be generated by the estimator 270 which, e.g., may be added directly to the voltage command output 40. The dither signal 255 may be a sine wave where the period, interval between periods, holdoff and amplitude may be configurable. The estimator 270 may maintain, e.g., two state variables: inputCorrelation and outputCorrelation.

When a period of the dither completes, the inputCorrelation and outputCorrelation may be updated in the following fashion:

$$inputCorrelation = inputCorrelation\ (1-g) + g\sum_{i=0}^{N-1} \text{energy}\ [k-i]\ \text{dither}\ [k-i] \qquad \text{Eq. 26}$$

$$outputCorrelation = outputCorrelation\ (1-g) + g\sum_{i=0}^{N-1} \text{voltage}\ [k-i]\ \text{dither}\ [k-i] \qquad \text{Eq. 27}$$

$$inputCorrelationQ = inputCorrelationQ(1-g) + g\sum_{i=0}^{N-1} \text{energy}\ [k-i]\ \text{dither}\ [k-i-\tau] \qquad \text{Eq. 28}$$

$$outputCorrelationQ = outputCorrelationQ\ (1-g) + g\sum_{i=0}^{N-1} \text{voltage}\ [k-i]\ \text{dither}\ [k-i-\tau] \qquad \text{Eq. 29}$$

Where g may be, e.g., a configurable gain, energy[k−i], voltage[k−i] and dither[k−i] may be the $i^{th}$ previous energy measurement, applied voltage and dither. The value, N, may be the dither period. For values of g between zero and unity, inputCorrelation and outputcorrelation can be scaled estimates of, e.g., the real correlation between energy/dither and voltage/dither respectively. Equations 28 and 29 may be used with a dither signal, e.g., shifted by τ units. Typically τ may be chosen to be, e.g., around ¼ of the dither period. Thus Equations 28 and 29 may be used to give the imaginary part of the correlation. Referencing input to energy and output to voltage may be done deliberately, e.g., to emphasize that the estimation is treating energy as the independent variable and voltage as the dependent variable.

The gain estimate may constitute, e.g., the real part of the ratio of the two complex correlations:

$$\frac{dE}{dV} = \frac{outputCorrelation * outputCorrelationQ + inputCorrelation * inputCorrelationQ}{inputCorrelation^2 + inputCorrelationQ^2} \qquad \text{Eq. 30}$$

where two gain estimators may be used in the control system, e.g., one for the output energy and one for the MO energy. The output energy dV/dE estimator 250 may, e.g., provide a dither signal, e.g., for both gain estimators.

According to aspects of an embodiment of the present invention active spectrum control, e.g., on multi-chamber lasers may, e.g., be accomplished by adjusting the differential firing time between the two chambers. This may be done by using bandwidth control to determine the value for a DtMopaTarget instead of adjusting DtMopaTarget to maximize laser efficiency. This can, e.g., cause two fundamental problems for energy and timing control. The first problem may be caused by the $F_2$ control algorithm. In MO $F_2$ injection controller utilized, e.g., in applicants' assignee's XLA 1XX, 3XX and 3XX series multi-chamber MOPA and like lasers a weighted combination of MOPA timing (adjusted for optimal efficiency) and bandwidth may be utilized, e.g., to determine the timing and size of MO injects. Using MOPA timing to control bandwidth may render both of these values unusable for $F_2$ control. Another fundamental quantity, referred to as a MOPA Op Point, may also be needed to determine $F_2$ inject sizes. A second problem may be that of timing dither, e.g., which may be needed for the MOPA op point. Since the laser may be operating away from the peak of the energy vs. MOPA timing curve, energy may be much more sensitive to variations in differential timing in general and the timing dither in particular. A scheme may therefore be needed, according to aspects of an embodiment of the present invention to, e.g., reduce the effect of timing dither on energy while, e.g., still providing information about the derivative of laser efficiency, e.g., with respect to timing.

The purpose of the choice of a MOPA op point may be, e.g., to give some measure of the "distance," e.g., away from maximally efficient timing when the laser system is operating. A choice for MOPA op point may be selected to, e.g., satisfy several basic requirements: MOPA op point may be selected to be, e.g., approximately zero, e.g., when the laser is operating at the differential timing which gives maximum efficiency. MOPA op point should be monotonic in differential timing, e.g., over an expected range of operation. MOPA op point should be reasonably insensitive to changes in energy target. MOPA op point can be estimated during laser system operation.

A first choice for MOPA op point could be to simply use the difference between the current differential firing time, $t_{mopa}$ and a reference value, e.g., one corresponding to maximum efficiency, $t_{ref}$. Then MOPA op point may be simply:

$$MopaOpPoint = t_{mopa} - t_{ref} \qquad \text{Eq. 30g}$$

This can be seen, e.g., to obey the first three requirements for a MOPA op point just noted, but it does not necessarily meet the estimatability requirement. $t_{ref}$ can be shown to vary during operation, e.g., due to duty cycle, $F_2$ injects, or energy set point changes. Therefore, it may, e.g., not be directly available for computation. However, if, e.g., certain assumptions are made about the relationship between energy, voltage and timing, an estimate of this MOPA op point can be derived. A reasonable approximation for this relationship may be:

$$E = (V - V_0)E' e^{-(t_{mopa} - t_{ref})^2 / 2w^2} \qquad \text{Eq. 30h}$$

where E is, e.g., the overall output energy of the, e.g., multi-chamber laser system, i.e., out of the PA or PO, V is, e.g., the voltage, e.g., a selected operating voltage for one or both chambers in the MOPA or MOPO configuration, which conveniently, for timing an other reasons, may be the same voltage and may be selected, e.g., by a determination of a voltage to be supplied by a resonant charger, e.g., to a respective magnetic pulse power system for each of the, e.g., MO and PA, $V_0$ is, e.g., a voltage offset, E' is, e.g., the derivative of energy with respect to voltage at maximum efficiency, and w is, e.g., a parameter describing the width of a peak (or other extremum) in, e.g., the energy vs. timing curve or voltage v. timing curve. Taking the derivative of E with respect to $t_{mopa}$ gives:

$$\frac{\partial E}{\partial t_{mopa}} = -\frac{t_{mopa} - t_{ref}}{w^2}(V - V_0) E' e^{-(t_{mopa} - t_{ref})^2 / 2w^2} \qquad \text{Eq. 30i}$$

Taking these last three equations together gives an expression for MopaOpPoint $$MopaOpPoint = -w^2 \frac{1}{E} \frac{\partial E}{\partial t_{mopa}} \qquad \text{Eq. 30j}$$

Using, e.g., timing dither, the derivative of energy with respect to MOPA timing, $\partial E/\partial t_{mopa}$, can be estimated, and energy may then be directly available as a measurement. Since the estimate of $\partial E/\partial t_{mopa}$ may require some low pass filtering, Eq. 30j could be modified to give the energy measurement similar convergence time.

$$MopaOpPoint = -w^2 \frac{1}{E_{ave}} \frac{\partial E}{\partial t_{mopa}} \qquad \text{Eq. 30k}$$

where $E_{ave}$ may be a low pass filtered version of the energy measurement. Furthermore, in some implementations, the derivative of energy with respect to MOPA timing may not be estimated, by instead, the derivative of voltage with respect to MOPA timing at constant energy may be available and utilized. In this case, the equation may be modified for use a follows.

$$MopaOpPoint = w^2 \frac{1}{E_{ave}} \frac{\partial E}{\partial V} \frac{dV}{dt_{mopa}}\bigg|_E \qquad \text{Eq. 30l}$$

The structure of Eq.'s 30k and 30l can indicate, e.g., how to construct other MOPA op point estimates. In both cases, a derivative with respect to timing may be used to create a measurement which is, e.g., zero when timing is near maximum efficiency, and which is, e.g., monotonic in MOPA timing. The measurement may then be, e.g., desensitized to, e.g., changes in energy by dividing by energy. The constants, w and dE/dV, do not really add any functionality to the estimates, so that if removed these two new expressions for MOPA op point arise as follows, reflecting implementations of determinations of the desired MOPA op point.

$$MopaOpPoint = \frac{1}{E_{ave}} \frac{\partial E}{\partial t_{mopa}} \qquad \text{Eq. 30m}$$

$$MopaOpPoint = \frac{1}{E_{ave}} \frac{dV}{dt_{mopa}}\bigg|_E \qquad \text{Eq. 30n}$$

Where Eq. 30n has been implemented in prior applicants' assignee's XLA model laser system control systems.

According to aspects of an embodiment of the present invention, there may be two basic algorithms which can be used to implement ASC. In the first one, e.g., bandwidth control may be utilized to drive the differential timing directly and MOPA op point may be used otherwise, e.g., for gas injection control. This may be implemented as follows: (1) adjust dTMopaTarget as a function of bandwidth error; (2) estimate MopaOpPoint in the energy and timing control algorithm; (3) adjust $F_2$ injects to drive MopaOpPoint to a target value (such as zero). A second algorithm may, e.g., use MopaOpPoint to control bandwidth. This may be implemented as follows: (1) adjust desired MopaOpPoint as a function of bandwidth error; (2) estimate MopaOpPoint in the energy and timing control algorithm; (3) adjust dTMopaTarget to drive MopaOpPoint toward a desired MopaOpPoint from a bandwidth control standpoint; and (4) adjust $F_2$ injects to drive either MopaOpPoint or desired MopaOpPoint to target value. The former algorithm may be easier to implement.

Figure 11:
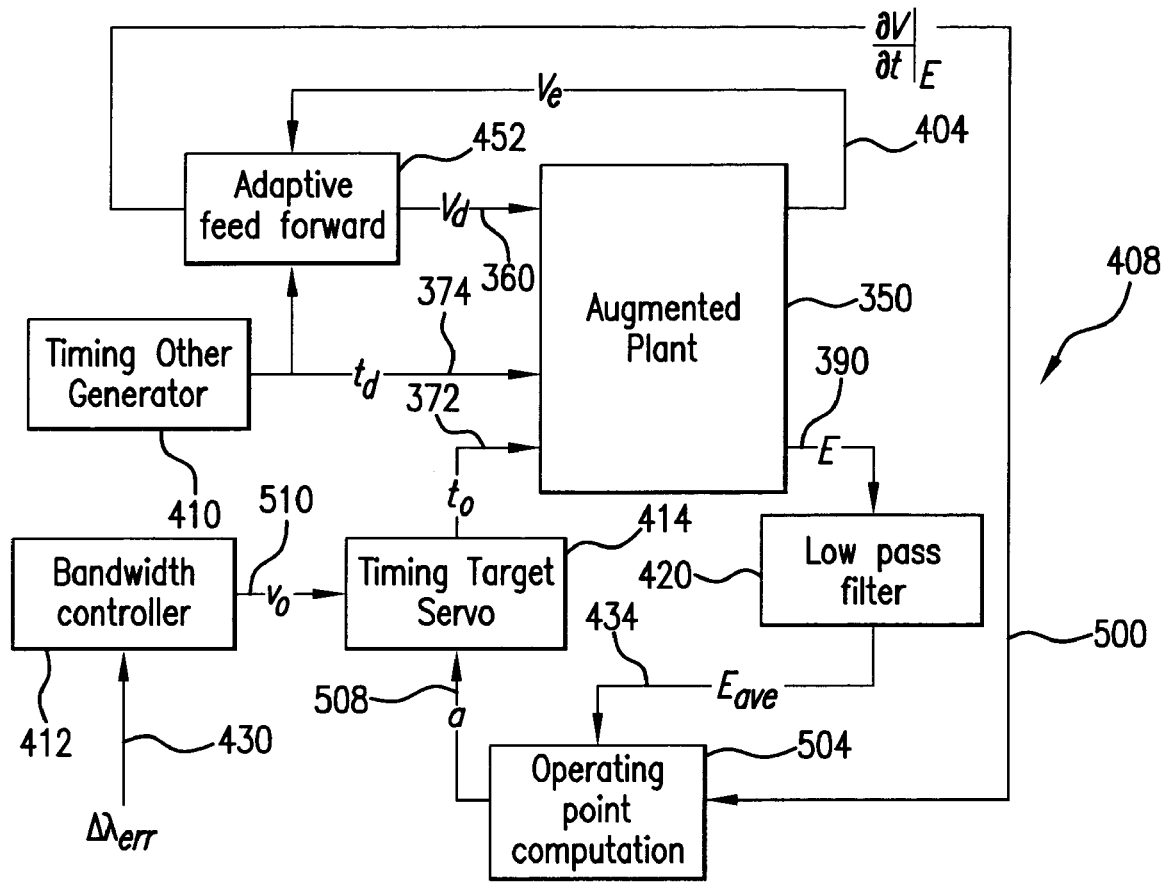
FIG. 11 shows illustratively and in schematic block diagram form a multi-chamber timing and output energy controller according to aspects of an embodiment of the present invention.
Figure 14:
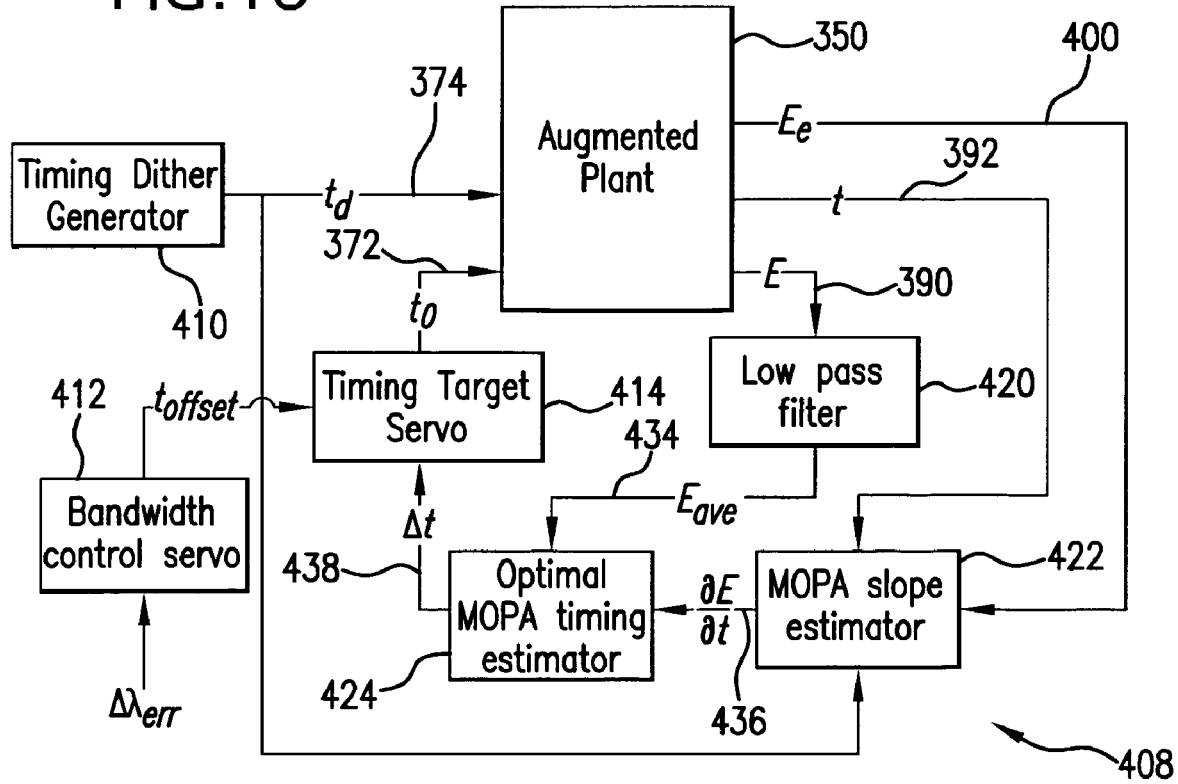
FIG. 14 shows illustratively and in schematic block diagram format a multi-chamber laser controller system.
Figure 23:
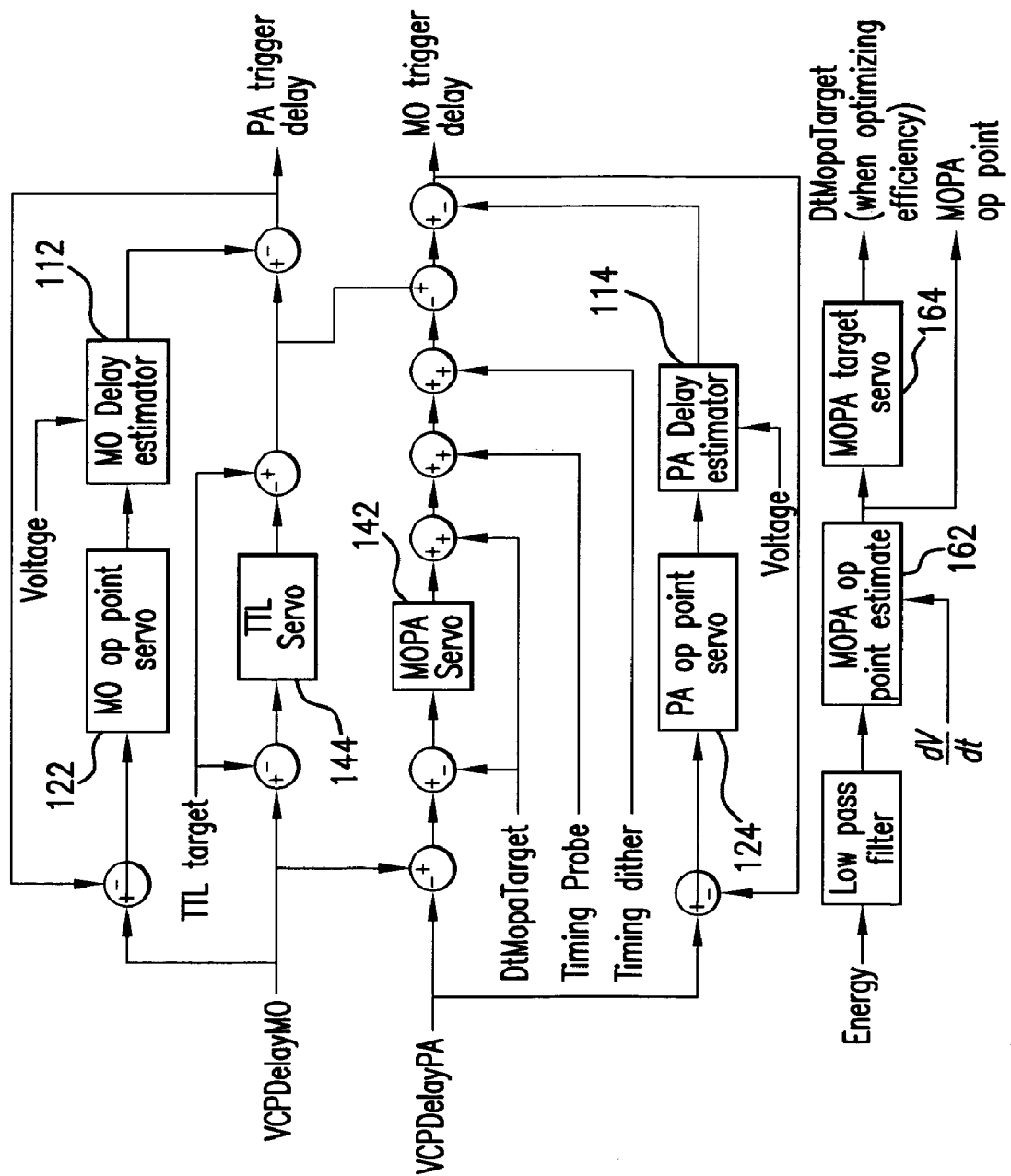
FIG. 23 illustrates schematically and in block diagram form modifications to the controller of FIG. 3 according to aspects of an embodiment of the present invention; and, FIG. 24 illustrates schematically in block diagram form an adaptive controller portion according to aspects of an embodiment of the present invention.

FIG. 23 illustrates a somewhat simplified structure of the timing controller such as shown in FIG. 3 along with modifications of support the above described modifications, e.g., to support ASC. In order to so support ASC, the timing controller 100 should be capable of 1) accepting the MOPA target provided, e.g., by a bandwidth control algorithm, e.g., when MOPA timing mode is set to ASC, 2) using, e.g., the dV/dt estimate from the energy and timing algorithm, e.g., to adjust MOPA target, e.g., when MOPA timing mode is set to maximize laser efficiency. FIG. 14 illustrates, e.g., how the algorithm, e.g., of FIG. 3, canb, e.g., be modified to support ASC. Energy signal 156 may be low pass filtered, e.g., in a low pas filter, e.g., 420 as illustrated in FIG. 11 and combined with a dV/dt estimate, e.g., from a MOPA slope estimator, e.g., 164 as shown in FIG. 3 from the energy algorithm, e.g., in order to generate a MOPA op point, e.g., to be used by a gas control system. When ASC is enabled, DtMopaTarget may come from a bandwidth control algorithm. When ASC is disabled, behavior could revert to maximizing efficiency. Do this, the MOPA op point may also be used by the MOPA target servo, e.g., 164 shown in FIG. 3, e.g., to drive DtMopaTarget, e.g., to a maximally efficient value.

Figure 24:
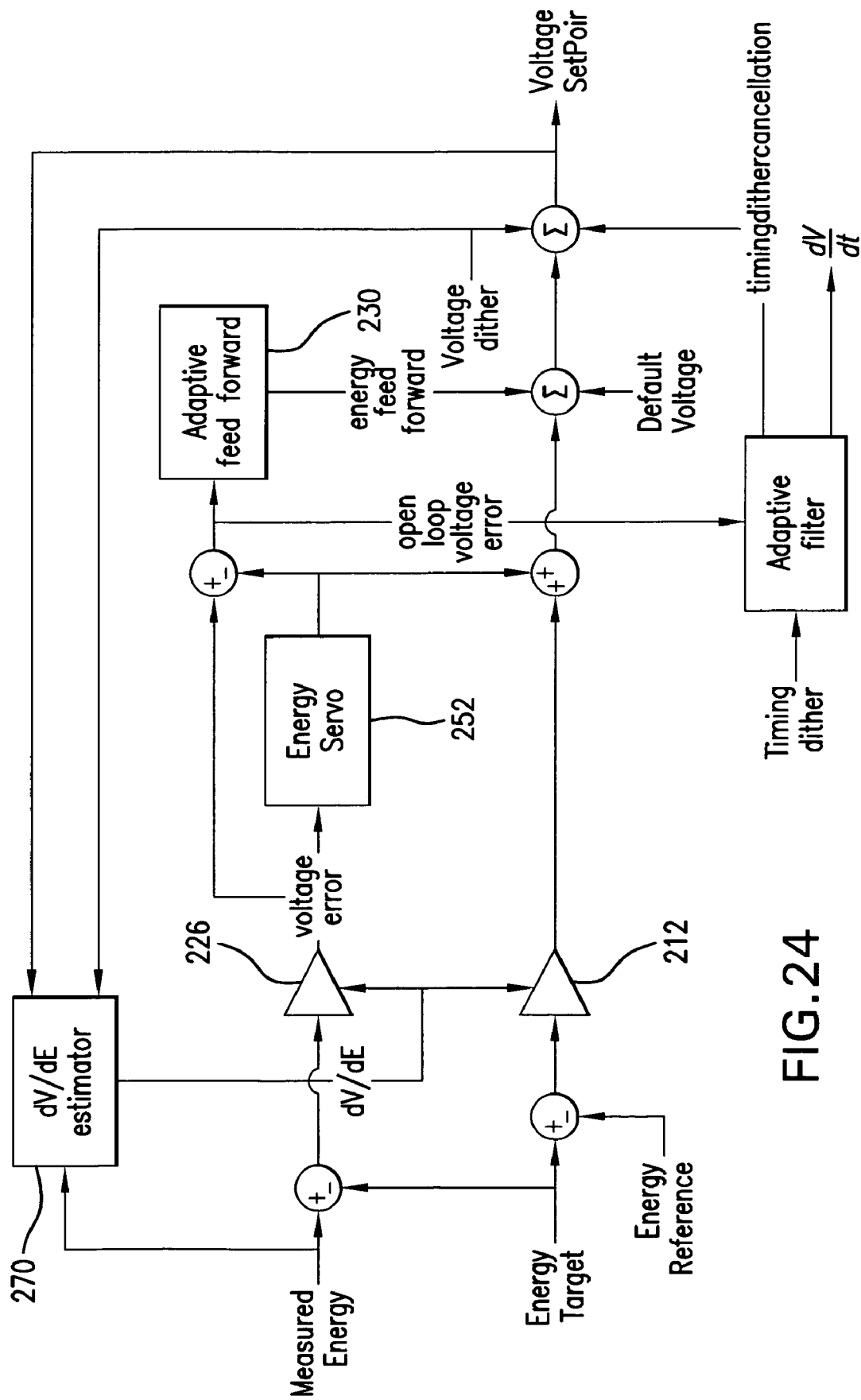

The energy controller 200 may be utilized, e.g., to achieve two objectives. First, the estimation of $dV/dt_{mopa}$ and second the desensitization of energy output to the timing dither. This may be accomplished through the use, e.g., of an LMS adaptive filter, e.g., 275 illustrated by way of example schematically in block diagram form in FIG. 24. FIG. 24 illustrates a simplified version of an energy control system such as is shown in more detail in FIG. 4 along with modifications to the algorithm. An approximate of an open loop energy error, e.g., voltage error less the action of the energy servo 252 may be used, e.g., as an error signal to the filter 275. The timing dither signal, e.g., from the MOPA slope estimator 162 in the timing algorithm as illustrated, e.g., in FIG. 3 may be used as a reference. The filter 275 may generate a scaled version of the timing dither signal, e.g., which when added to the voltage command, produces a signal "timingdithercancellation" that can be used to cancel the effects of the timing dither signal. As a side effect, the LMS filter 275 may also be utilized to estimate $dV/dt_{mopa}$.

The dither cancellation voltage may be computed as:

$$V_{cancel}[k] = \frac{dV}{dt_{mopa}}[k] t_{dither}[k] \qquad \text{Eq. 40}$$

where $V_{cancel}$ is the cancellation voltage, $t_{dither}$ is the timing dither and $dV/dt_{mopa}$ is the estimate of the derivative of voltage with respect to MOPA timing, e.g., at constant energy. $dV/dt_{mopa}$ may be updated using an LMS adaptive filter equation, e.g.:

$$\frac{dV}{dt_{mopa}}[k+1] = \frac{dV}{dt_{mopa}}[k] - \mu \varepsilon[k] t_{dither}[k] \qquad \text{Eq. 41}$$

where $\mu$ is an adaptation gain and $\varepsilon$ is an open loop energy error.

The bandwidth and $F_2$ control algorithms may be as follows. The bandwidth control algorithm may adjust MOPA timing, e.g., in order to drive the system, e.g., to a target bandwidth value. In such laser systems as noted above bandwidth decreases with increasing MOPA timing, dtMOPA. Thus, the bandwidth control law can take the form:

$$\text{DtMopaTarget}[k+1] = \text{DtMopaTarget}[k] + k_{Bw}(\Delta\lambda_{measured} - \Delta\lambda_{target}) \qquad \text{Eq. 42}$$

since it is often desirable to prevent the laser system from wandering to far away from maximum efficiency, using MOPA op point can be a way to limit this. For example, if MOPA op point is outside of a specified range, then the following logic may be used:

$$\text{DtMopaTarget}[k+1] = \text{DtMopaTarget}[k] - k_{OP}(\text{MopaOpPoint}[k] - \text{MopaOpPoint}_{max}) \qquad \text{Eq. 43}$$

when MOPAOpPoint is greater than the maximum desired value and:

$$\text{DtMopaTarget}[k+1] = \text{DtMopaTarget}[k] - k_{OP}(\text{MopaOpPoint}[k] - \text{MopaOpPoint}_{min}) \qquad \text{Eq. 43}$$

When MOPAOpPoint is less than the minimum desired value.

The $F_2$ control algorithm may needs to be used, e.g., to adjust MO injects, e.g., to drive the MOPA op point to a target value. The local behavior of MOPA op point can be described, e.g., by the equation:

$$du = \frac{\partial u}{\partial F_2} dF_2 + \frac{\partial u}{\partial t_{mopa}} dt_{mopa} \qquad \text{Eq. 44}$$

where u is MOPA op point and $F_2$ is the amount of $F_2$ in the a chamber, e.g., the MO chamber. The bandwidth control system may be adjusting $t_{mopa}$ to keep bandwidth constant.

$$d\Delta\lambda = \qquad \text{Eq. 45}$$

$$\frac{\partial \Delta\lambda}{\partial F_2} dF_2 + \frac{\partial \Delta\lambda}{\partial t_{mopa}} dt_{mopa} = 0 \Rightarrow dt_{mopa} = -\left(\frac{\partial \Delta\lambda}{\partial t_{mopa}}\right)^{-1} \frac{\partial \Delta\lambda}{\partial F_2} dF_2$$

Using this expression for $dt_{mopa}$ gives:

$$\frac{du}{dF_2} = \frac{\partial u}{\partial F_2} - \frac{\partial u}{\partial t_{mopa}} \left(\frac{\partial \Delta\lambda}{\partial t_{mopa}}\right)^{-1} \frac{\partial \Delta\lambda}{\partial F_2} \qquad \text{Eq. 46}$$

When the MO chamber is injected, e.g., the maximum efficiency MOPA timing may shift down, therefore MOPA op point may increase, e.g., with respect to $F_2$ injects. By design, the MOPA op point can be made to always increase with MOPA timing. Increasing MOPA timing decreases bandwidth and increasing $F_2$ increases bandwidth. Putting this together with the above equation can give:

$$\frac{\partial u}{\partial F_2} > 0, \frac{\partial u}{\partial t_{mopa}} > 0, \frac{\partial \Delta\lambda}{\partial t_{mopa}} < 0, \frac{du}{dF_2}, \frac{\partial \Delta\lambda}{\partial F_2} > 0 \Rightarrow \frac{du}{dF_2} > 0 \qquad \text{Eq. 47}$$

The MOPA op point can be made to monotonically increase with respect to MO $F_2$ injects, e.g., when timing is adjusted to maintain constant bandwidth. Therefore the $F_2$ algorithm could employ the following logic: if MOPA op point is too high, decrease the rate of $F_2$ injects, and if MOPA op point is tool low, increase the rate of $F_2$ injects. Table 1 describes symbols and terminology used in illustrating aspects of an embodiment of the present invention.

Figure 13:
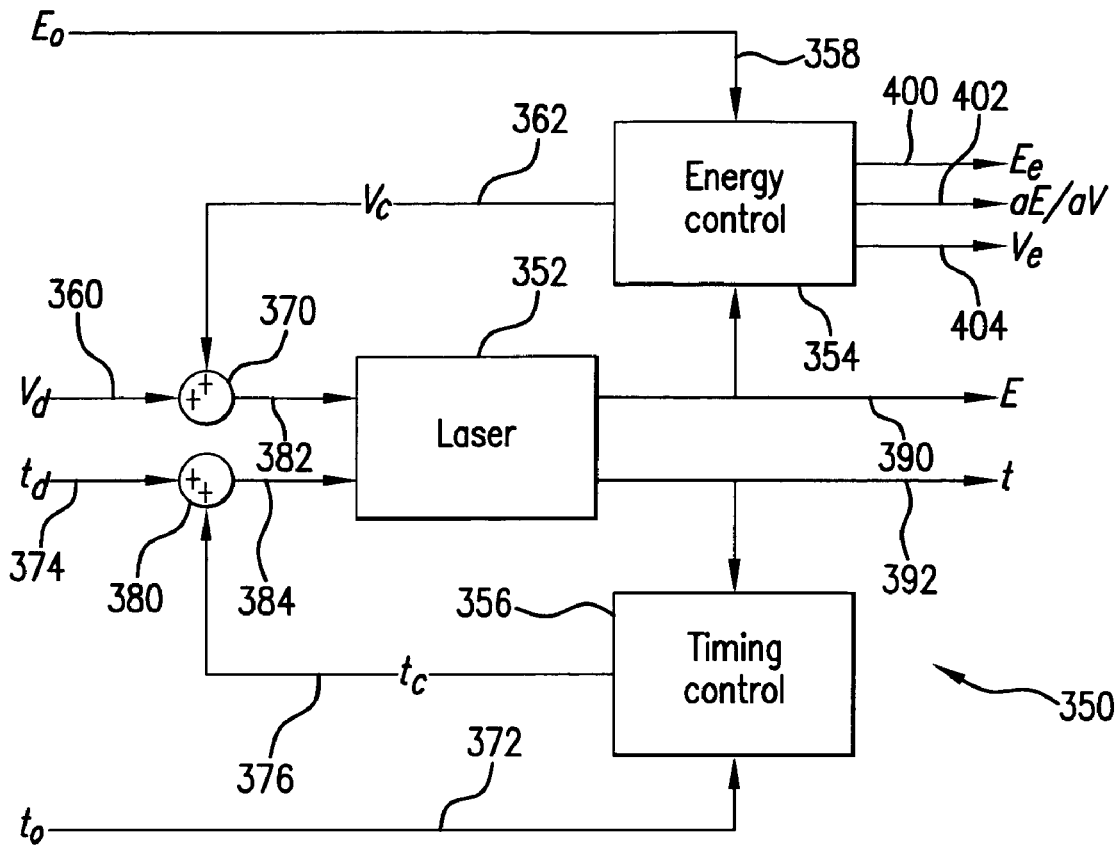
FIG. 13 shows illustratively in schematic block diagram form a so-called augmented plant of a multi-chamber laser controller system according aspects of an embodiment of the present invention.

According to aspects of an embodiment of the present invention other forms of addition to the existing controller, e.g., as used in applicant's assignee's XLA series lasers previously noted, as is illustrated above, including the concept of an augmented plant 350, may be utilized, e.g., as illustrated in FIG. 13 according to aspects of an embodiment of the present invention. The augmented plant 350 can include the laser 352, the energy controller 354, and the timing controller 366. The augmented plant 350 may have, e.g., four inputs, (1) an energy target, $E_0$, (2) a voltage dither signal, $V_d$, (3) a timing dither signal, $t_d$, (4) a the differential MOPA chamber firing time target, $t_0$.

According to aspects of an embodiment of the present invention, the voltage dither signal $V_d$ may be used as an additional voltage input, e.g., introduced by the modifications to the timing and energy algorithms. It is not the same as the voltage dither signal used, e.g., to estimate dE/dV and which is not explicitly included in the discussion of presently discussed aspects of embodiments of the present invention. Outputs of the augmented plant 350 may be (1) an energy error, $E_e$, (2) an energy vs. voltage slope estimate, $\partial E/\partial V$, (3) an open loop voltage error, $V_e$, (4) an output energy, E, and (4) a measured differential MOPA chamber firing time, t. The voltage to be applied to the laser 352 may be, e.g., the sum of the voltage dither input $V_d$ and the commanded voltage $V_c$ from the energy controller 358. The energy controller 3584 may also generate, e.g., estimates of, e.g., $E_e$, $\partial E/\partial V$, $V_e$. A differential MOPA commutator firing command $t_a$ signal may be the sum of, e.g., the timing dither signal $t_d$ and the output of the timing controller $t_c$. According to aspects of an embodiment of the present invention the laser system 352 may take, e.g., firing voltage $V_c$ signal and differential MOPA commutator firing time, $t_a$ signal 384 as inputs and produce, e.g., measured energy E and differential MOPA chamber firing time t as outputs.

According to aspects of an embodiment of the present invention an additional aspect of the timing control can be used to, e.g., regulate the command mode portion of the MO and PA commutator firing commands, in order to, e.g., regulate the trigger to light time $T_{ttl}$. This portion of the controller 350 may be completely decoupled, e.g., from the energy and timing controllers 354, 356 under discussion here and is omitted from the figures for clarity.

According to aspects of an embodiment of the present invention the timing controller 356 may adjust, e.g., the commanded MOPA commutator firing time $t_c$ in response to, e.g., errors between the desired to and measured MOPA chamber firing difference time t. In it's simplest form, a timing servo in the timing controller 356 may be a discrete integrator:

$$t_c[k+1] = t_c[k] - g_t(t[k] - t_0[k]) \qquad \text{Eq. 48}$$

where $g_t$ may be a constant gain. Additional enhancements to the timing control currently used, e.g., in one or more of applicant's assignee's XLA series laser systems as illustrated by example above, according to aspects of an embodiment of the present invention may be compensation for commutator delay vs. voltage effects and/or gain scheduling based upon the size of the error. According to aspects of an embodiment of the present invention the timing controller 356 may compute a differential MOPA commutator firing command tC, e.g., based upon the desired $t_0$ and measured t MOPA chamber differential firing times, e.g., for an upcoming pulse k based upon the error for a preceding pulse k−1 scaled by some gain $g_t$.

Figure 8A:
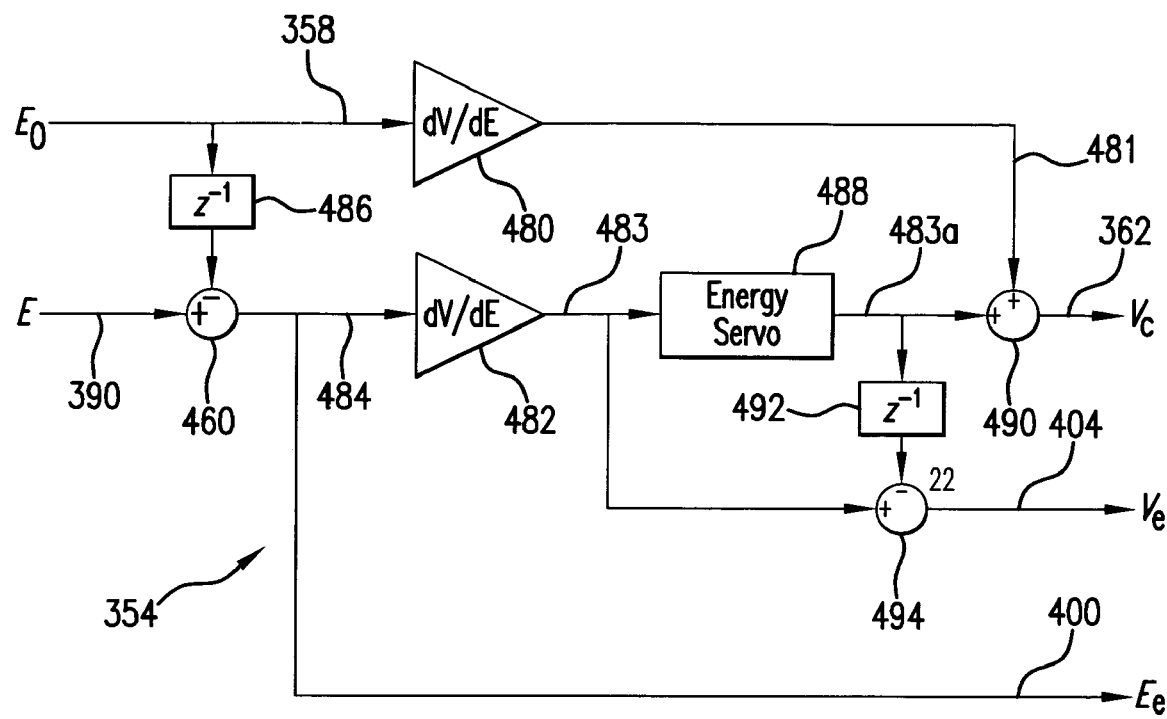
FIG. 8A illustrates a modification to a portion of the controller shown in FIG. 4.

According to aspects of an embodiment of the present invention an energy controller 354 which is illustratively shown schematically in FIG. 8A may employ several levels, e.g., three levels of control. In a first level, e.g., according to aspects of an embodiment of the present invention, as illustrated schematicaly and in block diagram form in FIG. 8A, e.g., the energy target, $E_0$, signal 358, may be scaled in an $E_0$ energy scaling amplifier 480, e.g., by the inverse of the energy vs. voltage slope estimate, $\partial E/\partial V$, i.e., dV/dE. This scaling in amplifier 480 may, e.g., produce one component 481 of the commanded voltage $V_c$ 3624. According to aspects of an embodiment of the present invention this can be utilized, e.g., to desensitize the energy error $E_e$, e.g., to large changes in energy target $E_0$. In a second level of control, e.g., the difference between the energy target $E_0$, input signal 358 (e.g., which may be delayed by one sample in delay unit 486) and the actual measured energy E, input signal 390 may be filtered in an $E_0$-E signal amplifier 482, e.g., to produce a compensating signal 483 from the function dV/dE which can tend to drive the energy error to zero. In the current implementation of, e.g., the XLA series controllers, such as illustratively discussed above, this control law can be, e.g., an integral-integral squared feedback. The energy error E, can be scaled by $\partial E/dV$, e.g., prior to being filtered to, e.g., keep the loop gain constant. A third level of control can be, e.g., burst to burst feed forward control (not shown). This controller 354 can, e.g., compute a voltage inversion waveform dV/dE which, e.g., can be applied for the first 20 or so shots of the burst, in order to, e.g., correct for energy transients. This waveform dV/dE can be adapted on a burst to burst basis.

For stable adaptation, the feed forward algorithm may, e.g., utilize an estimate $V_e$ signal 404 of the open loop voltage error with the effect of the energy servo removed. This is the signal, $V_e$, 404 shown, e.g., in FIG. 15. A useful property of this $V_e$ signal 404 is that the closed loop transfer function from voltage dither, $V_d$, to $V_e$ can be approximately unity, e.g., when the error in the estimate of the energy vs. voltage slope, $\partial E/dV$, is small. $\partial E/dV$ can be estimated by adding a four pulse voltage signal to the laser voltage $V_c$ and, e.g., correlating this signal with the laser input voltage $V_c$-$V_d$ and output energy E to arrive at an estimate of energy vs. voltage sensitivity $\partial E/dV$ signal 402. This estimator can be omitted from the depiction, e.g., in FIG. 13, of the energy controller here for clarity. The energy controller 354 may compute a voltage command $V_c$, signal 404, which may be intended, e.g., to minimize the error between the measured energy E and the desired energy target $E_0$.

Figure 16:
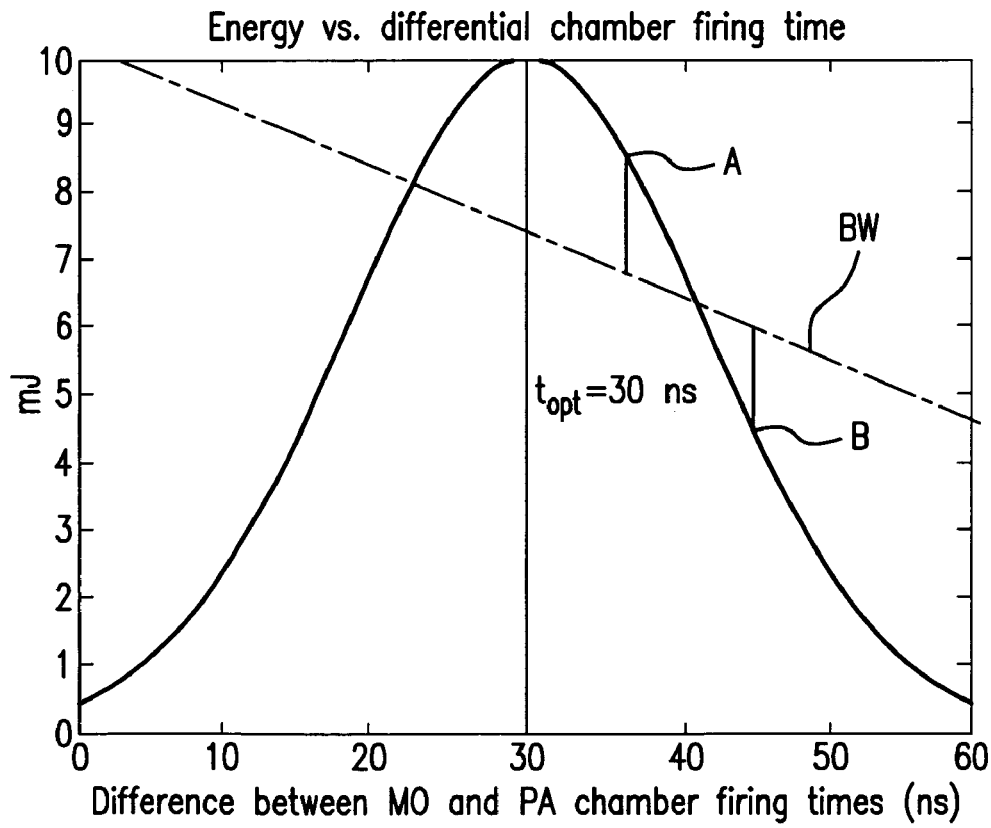
FIG. 16 shows an example of an operating point curve for a parameter of a multi-chamber laser system, e.g., the output energy, resulting from operation of the multi-chamber laser system varying another laser system operating parameter, e.g., the value of dtMOPA, and an exemplary relationship between another laser operating parameter, e.g., bandwidth for variation of the same parameter, e.g., dtMOPA.
Figure 17:
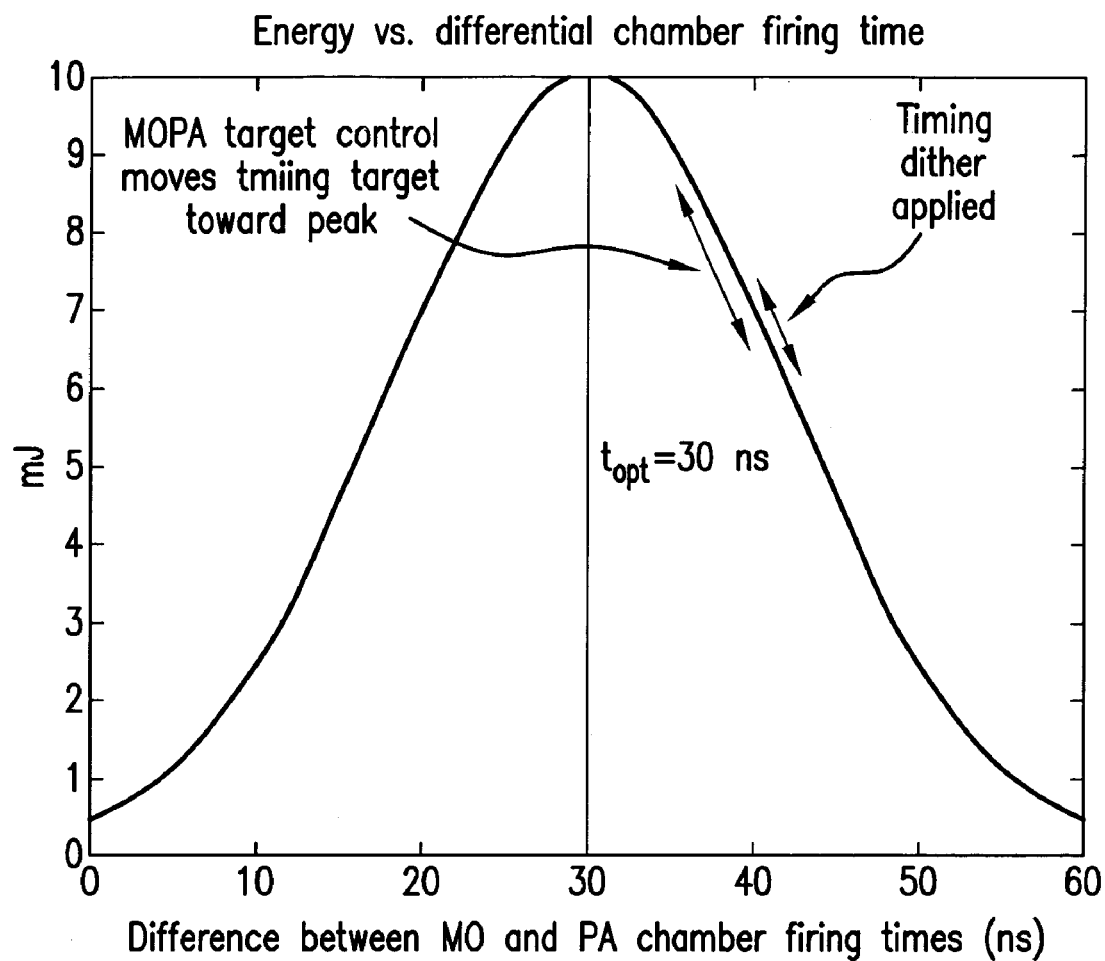
FIG. 17 illustrates an example of a operating the laser system according to a similar operating point curve for, e.g., energy v. dtMOPA, as is shown in FIG. 16, with a controller that drives the operating point on the curve to an maximum of one operating parameter, e.g., output energy.

In Applicants' assignee's current laser systems, e.g., XLA 1XX laser systems, e.g., the MOPA timing target, $t_0$ (the desired MO to PA differential discharge timing), can be adjusted, e.g., so that the laser system operates at the top of the MOPA timing efficiency curve. FIG. 16, e.g., shows an example of an energy vs. MOPA timing curve at fixed voltage, e.g., $V_c$. The energy E can be maximized, e.g., when t=$t_{opt}$ and then, as illustrated, can drop off as the timing is varied away from optimal $t_{opt}$ on either side of the curve from the $t_{opt}$. In, e.g., a typical energy vs. differential MOPA chamber firing time curve voltage can be maintained constant, e.g., while the MOPA timing can be varied. At the exemplarily indicated optimal differential chamber firing time (e.g., 30 ns), a maximum energy output can be achieved. FIG. 17 illustrates by way of example how the above noted current MOPA target control can be implemented, e.g., in applicant's assignee's XLA 1XX series multi-chamber lasers. A timing dither signal, $t_d$ can be generated as an input to the augmented plant 350.

Figure 9:
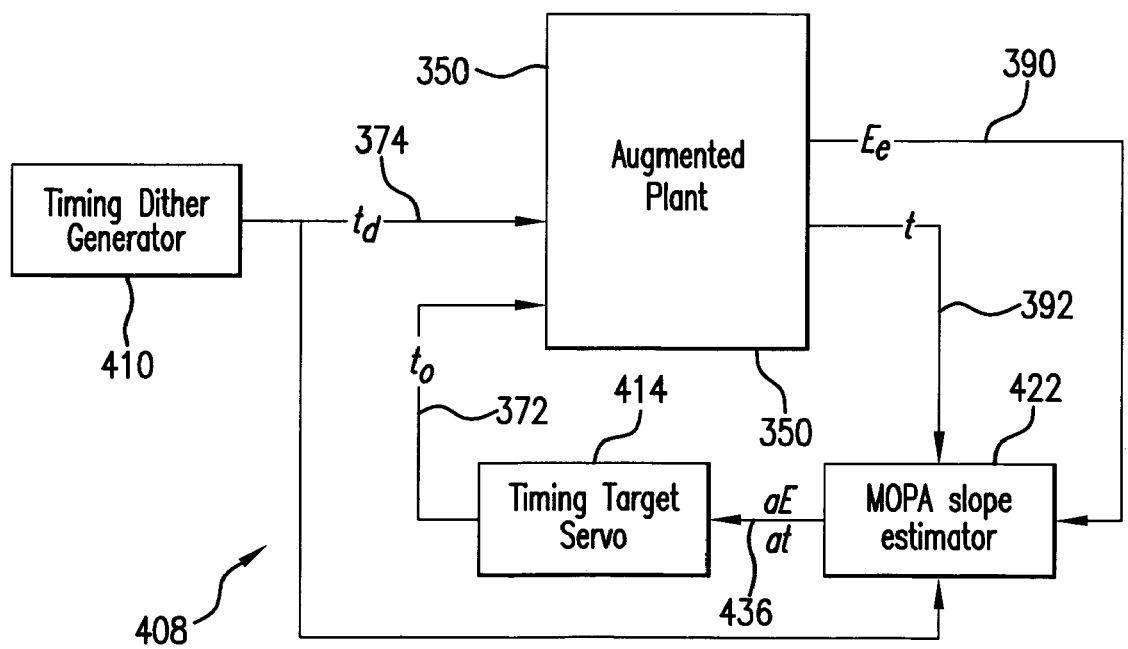
FIG. 9 illustrates a modification to a portion of the controller shown in FIG. 3.

This dither signal $t_d$ may have a fixed amplitude sine wave, e.g., at the Nyquist frequency. In other words, the dither signal $t_d$ may oscillate between a positive and negative value, e.g., on every other shot. The slope of the energy vs. timing curve can be estimated, e.g., by correlating the timing dither signal, e.g., with the differential MOPA chamber firing time t measurement 392 and measured output energy E signal 390 and taking the ratio $\partial E$/dt to form output signal 436. This operation is illustrated schematically in FIG. 9. A timing target servo 414 can execute a very simple control law, which can, e.g., cause the MOPA timing target $t_0$ value 372 to be stepped "uphill" until the estimated MOPA slope $\partial E$/dt signal 436 is zero, e.g., according to Equation 36.

$$t_0[k] = t_0[k-1] + g\frac{\partial E}{\partial t}[k] \qquad \text{Eq. 49}$$

FIG. 17 shows, illustratively the action of this controller 354. In the action of, e.g., current MOPA timing controllers, e.g., in applicant's assignee's above mentioned MOPA laser systems, as discussed above, a timing dither $t_d$ signal 374 can be applied to the commanded timing $t_c$ 376, e.g., at the current operating point, e.g., before this is sent to the laser controller 352. The dither signal $t_d$ can be applied, e.g., at the current operating point and the controller 352 can act to move the operating point, e.g., to the peak of the energy vs. timing curve. A useful property of this controller 352 can be that, e.g., once the timing target $t_0$ has converged (e.g., the laser system is operating at the top of the curve), the sensitivity of output energy E to the timing dither $t_d$ can be made to be zero. Therefore, the use of the timing dither $t_d$ can be utilized without degrading the stability of output energy E.

Figure 10:
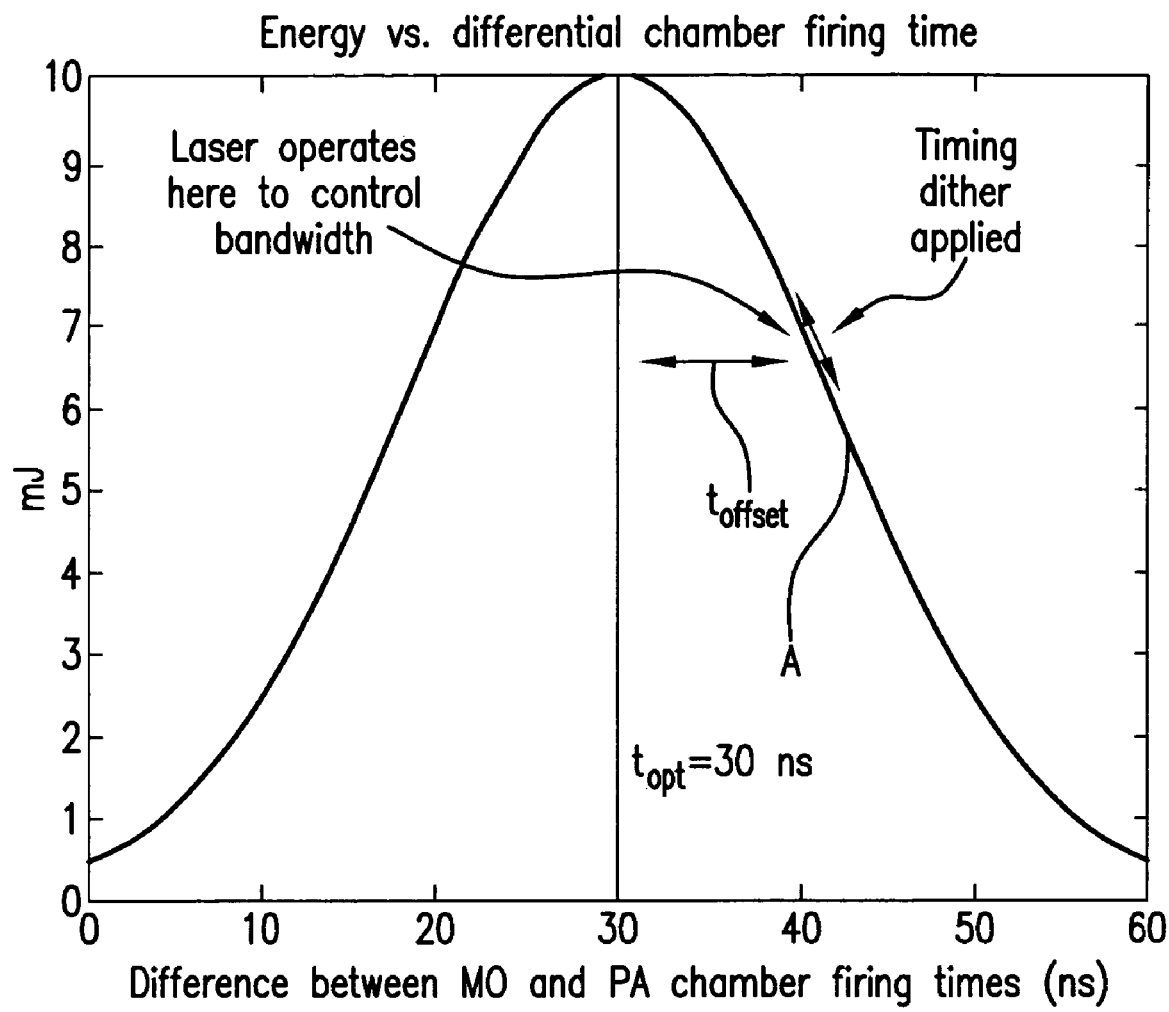
FIG. 10 is similar to FIG. 17 representing an illustrative controller system wherein the controller drives the operation of the laser system to a point on the operating curve that gives a desired bandwidth output, e.g., by driving an offset from an optimum operating point (e.g., at the max of the energy output) to the desired point on the operating curve.

According to a aspect of an embodiment of the present invention the system may be made to, e.g., operate away from the peak of the MOPA timing curve, e.g., in order to regulate a laser system output, e.g., bandwidth. FIG. 10 illustrates aspects of an embodiment of the present invention. Instead of operating, e.g., at the top of the energy vs. timing curve, the laser can be made to operate off of the peak. According to aspects of an embodiment of the present invention applicant has noted that as the distance away from the peak increases there can be a strong influence on the spectrum of the light coming out of the laser system. Thus according to aspects of an embodiment of the present invention by, e.g., adjusting the distance the laser operates away from the peak, $t_{offset}$, bandwidth output of the laser system can be controlled.

FIG. 14 shows illustratively and schematically a controller designed to do this. A desired offset from the peak, $t_{offset}$, may be computed by a bandwidth control servo 412. A simple law for this control servo might be:

$$t_{offset}[k] = t_{offset}[k-1] + g\Delta\lambda_{err} \qquad \text{Eq. 50}$$

where g is a gain selected to give timely reduction of the bandwidth error. The rest of the control servo 412 may be designed, e.g., to drive the operating point of the laser on the dE/ddtMOPA operating curve to this desired offset. A MOPA slope estimator 422 may, e.g., continue to operate as it does in applicant's assignee's current XLA control design. In addition to this, a low pass filter 420 may be applied to the measured energy E signal 390, e.g., in order to obtain an average energy $E_{ave}$, output signal 434 measurement. The time constant of this filter 420 may be, e.g., matched to the time constant of the filters 462, 472 used to estimate the MOPA slope.

Given the slope of the curve and the energy value, it is possible to estimate the offset from the peak by making some assumptions about the shape of the dtMOPA timing curve. A not unreasonable model is to assume a law of the form:

$$E_{ave} = E_p e^{-(\Delta t)^2/(2\sigma^2)} \qquad \text{Eq. 51}$$

where $E_p$ is the peak energy one could expect operating at the peak of the MOPA timing curve while firing at the current voltage, and σ is a known parameter which determines the width of the curve. The ratio of the slope and the energy can be represented as:

$$\frac{\partial E/\partial t}{E_{ave}} = \frac{-\Delta t}{\sigma^2} \qquad \text{Eq. 52}$$

An estimate for the offset from the optimal timing which could be implemented by an "Optimal MOPA timing estimator" 424 can therefore be represented as, e.g.:

$$\Delta t = -\frac{\sigma^2 \partial E/\partial t}{E_{ave}} \qquad \text{Eq. 53}$$

With an estimate of the distance between the current timing operating point and the optimal efficiency timing operating point, Δt, the timing target servo 414 in FIG. 14 can take the form:

$$t_0[k] = t_0[k-1] + g(t_{offset} - \Delta t) \qquad \text{Eq. 54}$$

This controller can act to drive the laser to a desired operating point.

Figure 15:
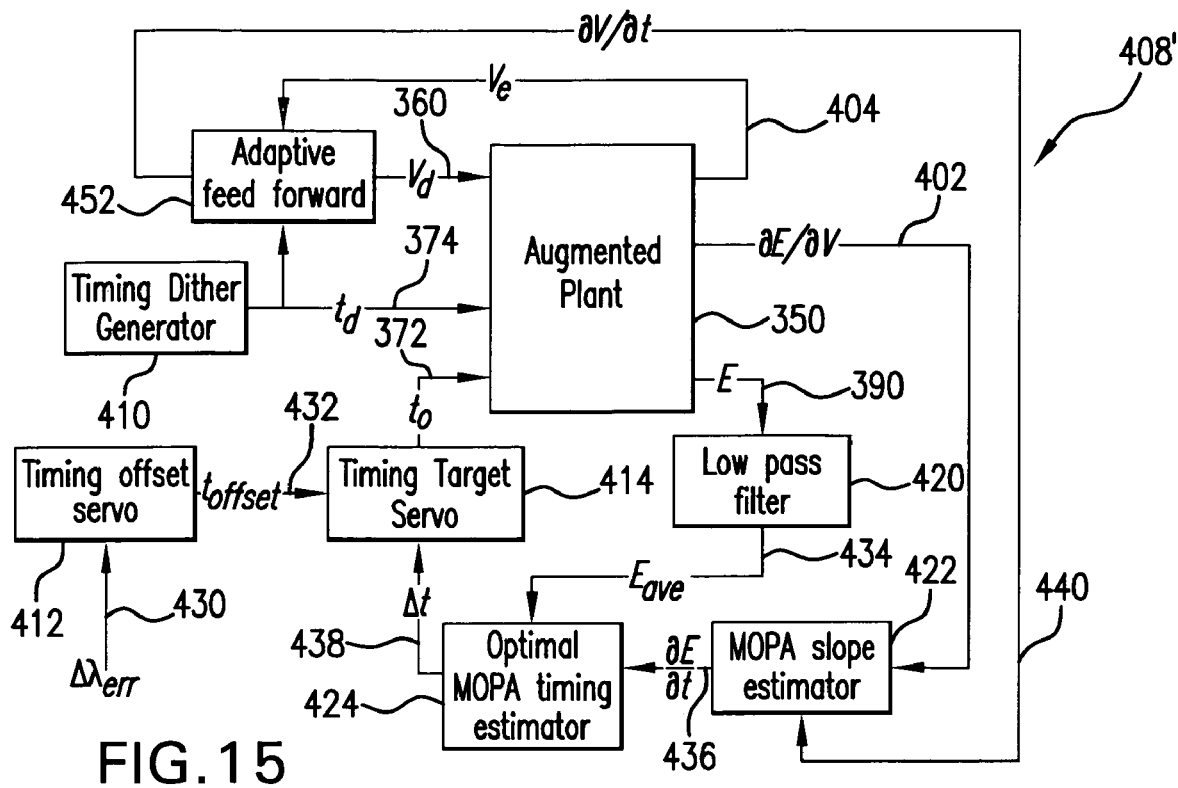
FIG. 15 shows illustratively and in schematic block diagram form a multi-chamber timing and output energy controller according to aspects of an embodiment of the present invention.

One notable drawback of the previous illustrative version of the modified controller 408, is that when the controller 408 has converged on an operating point, the effect of the timing dither $t_d$ is now readily observable in the laser output energy E. This drawback can be addressed, e.g., as shown in an illustrative schematic illustration of a second version of the modified controller 408', as shown in FIG. 15. To eliminate the effect of the timing dither $t_d$ on the output energy E, the timing dither $t_d$ signal 374 can be used as a reference for an adaptive feed forward controller 452. An embodiment of this controller 452 could implement an LMS algorithm using an estimated open loop voltage error, $V_e$, as an error signal to adjust a voltage dither signal, $V_d$, to drive to zero a portion of the energy error correlated with the timing dither.

Canceling out the effect of the timing dither signal in the output energy in this fashion can require a slightly different method for estimating the slope of the energy vs. timing curve. Recall that the timing dither can be a sine wave at the Nyquist frequency:

$$t_d[k] = t_d^0(-1)^k \qquad \text{Eq. 55}$$

If the voltage dither necessary to cancel this is given by:

$$V_d[k] = V_d^0(-1)^k \qquad \text{Eq. 56}$$

then it follows that an estimate of the slope of the MOPA timing curve can be given by the ratio of the amplitudes of the two dither signals scaled by the energy vs. voltage slope estimate:

$$\frac{\partial E}{\partial t} = \frac{V_d^0}{t_d^0} \frac{\partial E}{\partial V} \qquad \text{Eq. 57}$$

Turning now to FIG. 13 there is shown illustratively and in schematic block diagram form an augmented plant 350, which may comprise a laser system controller 352 an energy controller 354 and a timing controller 356. The laser system controller 352 may have as inputs $V_d$ and $t_d$, modified as noted below to form input signals 382 and 384 and may provide as an output a measured energy signal E and a differential MO and PA firing time signal t. The energy controller 354 may be provided with an $E_0$ input signal 358 and the E signal and provide an output voltage command $V_c$ signal 362, which may be combined with $V_d$ in a summer 370 to form input signal 382. The energy controller 354 may also provide as outputs $E_c$ signal 400, ∂E/dV signal 402, and $V_e$ signal 404.

The timing controller 356 may have as an input $t_0$ and t and provide as an output $t_c$ which may be combined with $t_d$ to form the input signal 384.

Turning now to FIG. 14 there is shown illustratively and in schematic block diagram form a modified controller 408 according to aspects of an embodiment of the present invention, which may comprise an augmented plant 350 and a $t_0$ producing circuit which may comprise a timing dither generator 410, producing a timing dither signal $t_d$, and a bandwidth control servo 412 taking as an input the error between bandwidth and a desired bandwidth, $\Delta\lambda_{err}$, and producing $t_{offset}$, the desired dtMOPA differential time to make the $\Delta\lambda_{err}$ difference between the measured bandwidth and desired bandwidth, go to zero, e.g., according to values in a lookup table representing, e.g., points on a graph of the change in dtMOPA for a desired Δλ. The bandwidth control servo 412, also referred to as a timing offset servo 412, can provide the $t_{offset}$ signal 432 to a timing target servo 414, which can also receive a Δt signal 438 and produce a $t_0$ signal 372 according to, e.g., Eq. 50. The timing target servo 414 may receive the Δt signal 438 from an optimal MOPA timing estimator 424, which can receive a ∂E/dt signal 436 from a MOPA slope estimator 422 and an $E_{ave}$ output signal 434 from a low pass filter 420, which may low pas filter the measured energy E signal 390 out of the laser system on the augmented plant 350. The MOPA slope estimator 422 may receive the t signal 392 output of the augmented plant 350 and the $E_e$ signal 400 output of the augmented plant 350 along with a timing dither signal $t_d$ output from a timing dither generator 410, also shown in FIG. 14, and compute the ∂E/dt signal 436 according to, e.g., Eq. 57. The optimal MOPA timing estimator can compute the optimal Δt between the MO and PA for a given energy, the filtered $E_{ave}$ signal 438, value and provide it to the timing target servo 414 to compute the desired value of $t_0$ based, e.g., on the desired change in bandwidth to achieve a selected bandwidth, i.e., the $t_{offset}$ signal 432.

Turning now to FIG. 15 there is shown a modified controller system according to aspects of an embodiment of the present invention which may comprise elements shown in FIG. 14 along with an adaptive feed forward circuit 452 for computing a voltage dither $V_d$ signal 360, according to, e.g., Eq. 56. The adaptive feed forward computer 452 may also provide a ∂V/∂t output signal 440, computed according to the timing dither signal $t_d$, to the MOPA slope estimator 422, which may then compute the ∂E/dt signal 436 by multiplying the ∂V/∂t output signal 440 from the adaptive feed forward computer 452 by the ∂E/dV output signal 402 from the augmented plant 350.

Turning now to FIG. 8A there is illustratively shown in schematic block diagram form an energy controller 354 which may comprise an input $E_0$ signal 358 and an input measured laser system output energy E signal 390 summed in a summer 460, to obtain the value $E_e = E - E_0$, signal 484, with the $E_0$ signal 358, e.g., delayed, e.g., for one pulse in a $z^{-1}$ delay 486. The desired laser output energy $E_0$ signal 358 may also be provided to an energy controller $E_0$ dV/dE scaling amplifier 480 to provide a voltage command $V_c$ component output signal 481. A second command voltage $V_c$ component signal 483 may be provided from an energy controller $E_{(k)}$-

$E_{0(k-1)}$ dV/dE scaling amplifier 482 providing an output signal 483 to an energy servo 488. The components 481, 483*a* may be summed in a summer 490 to form the command voltage $V_c$ signal 362. In addition, the output 483*a* of the energy servo 488 may be, e.g., delayed, e.g., in a $z^{-1}$ delay 492 and subtracted from the input 483 to the energy servo 488 in a summer 494 to obtain the open loop voltage error $V_e$ signal 404 output of the energy controller 354. The value of the $E_e = E_{(k)} - E_{0(k-1)}$ signal 484 may form the $E_e$ output 400 from the energy controller 354.

Figure 18:
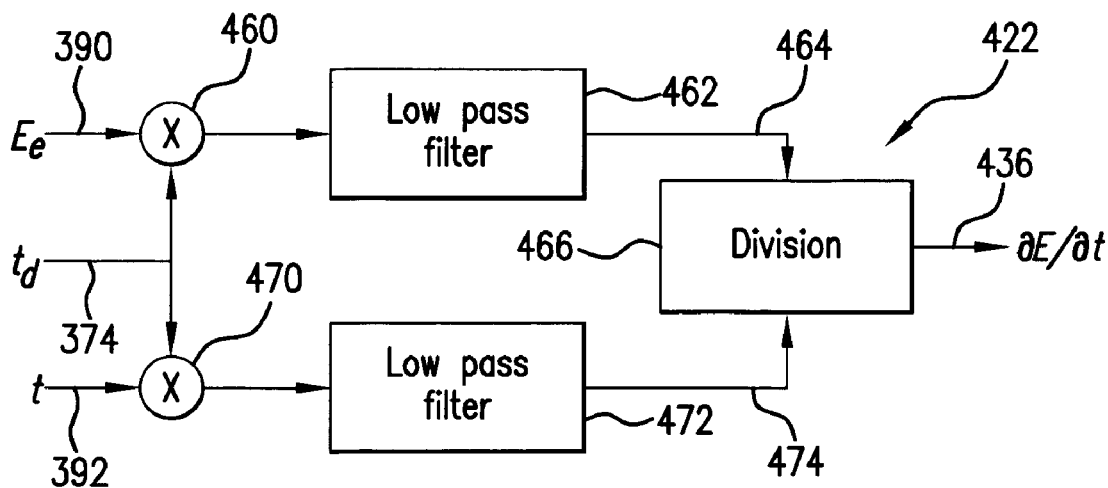
FIG. 18 illustrates in schematic block diagram form an example of a dtMOPA curve slope estimation circuit.

Turning now to FIG. 18 there is illustratively shown in schematic block diagram form a MOPA slope estimator 422 according to aspects of an embodiment of the present invention, which may comprise a multiplier 460 receiving inputs of the $E_e$ signal 390 and $t_d$ signal 392 and providing an input to a low pass filter 462 which may provide the energy portion 464 of the ∂E/dt signal 436 to a divider 466. Similarly a multiplier 470 may multiply input td signal 374 and t signal 392 to form the input to a low pass filter 472 to provide the time portion 474 of the ∂E/dt signal 436 to a divider 466 to form the output ∂E/dt signal 436.

An objective of timing control could then be to drive the system to a desired offset to achieve an operating point on the operating curve and thus a desired bandwidth. To do this, the control system 408 could determine what timing would give peak operation and then compute, e.g., a current value of $t_{offset}$. Since, however, the laser is operating away from the peak, it may be difficult to determine what timing would actually result in peak efficiency without detailed knowledge of the shape of the energy vs. timing curve, shown by way of example in FIG. 16. This may be further complicated by the fact that the shape of the curve shown in FIG. 16 may change, e.g., depending on the laser operating condition (e.g., duty cycle, pulse repetition rate, output energy level, etc.). However, since the offset timing information may actually, e.g., be used in a feedback loop around bandwidth, a stable algorithm can be achieved, e.g., by using a value which is monotonic in offset timing, but is more readily measurable. One such value may be, e.g., the quantity:

$$u = \frac{1}{E_{ave}} \frac{\partial V}{\partial t}\bigg|_E \qquad \text{Eq. 58}$$

This quantity, u, referred to by applicants as the timing operating point may comprise the ratio of the derivative of the voltage with respect to timing at fixed output energy to the average energy. It can be shown that u is, e.g., monotonic in timing offset, e.g., for a wide range around the energy vs timing peak, e.g., of FIGS. 16, 17 and 10. Furthermore, it can also be shown, e.g., that u is zero when the offset timing $t_{offset}$ is zero. Therefore, a bandwidth controller 408' as illustrated by way of example in FIG. 11 implementing a control law of the form:

$$u_0[k] = u_0[k-1] + g\Delta\lambda_{err} \qquad \text{Eq. 59}$$

where $u_0$ is the desired timing operating point, can be made to have the objective of the timing controller 408' being, e.g., to drive the measured operating point, u, toward $u_0$. FIG. 11 shows a controller 408' designed to do this. The desired operating point, $u_0$, may be computed by the bandwidth controller 412 according to Eq. 59. The rest of the controller 408 may be designed to drive an operating parameter, e.g., E to this desired operating point.

A difficulty with operating away from the peak of the energy vs timing curve, is that the output energy is much more sensitive to the timing dither signal used to estimate the slope of the energy vs. timing curve. This can have deleterious effects for the laser energy stability. To eliminate the effect of the timing dither in the output energy, the timing dither signal may be used, e.g., as a reference for an adaptive feed forward filter 452 in FIGS. 15 and 11. An incarnation of this adaptive feed forward filter 452 in the controllers 408, 408' of FIGS. 15, 11 could implement an algorithm using the estimated open loop voltage error, $V_e$, as an error signal to adjust a voltage dither signal, $V_d$, e.g., an LMS algorithm, in order to, e.g., drive the portion of the energy error correlated with the timing dither to zero. In addition to producing the desired voltage dither signal, a side effect of this example of an operation of the adaptive feed forward filter 452 can be that it also can be used to estimate the derivative of voltage with respect to timing at constant energy, i.e., $$\frac{\partial V}{\partial t}\bigg|_E,$$

signal 500 in FIG. 11. Taking the ratio of this term to the average output energy $E_{ave}$, signal 434, in the operating point computation block 504 in FIG. 11 can be used to give a desired measurement of the timing operating point u, according to Eq. 44.

The measured and desired operating points can then be used to compute the desired differential firing times for the MO and PA chambers ($t_0$), e.g., in the timing target servo 414. This servo 414 could implement a simple feedback law of the form:

$$t_0[k] = t_0[k-1] + g(u - u_0) \qquad \text{Eq. 60}$$

Figure 12:
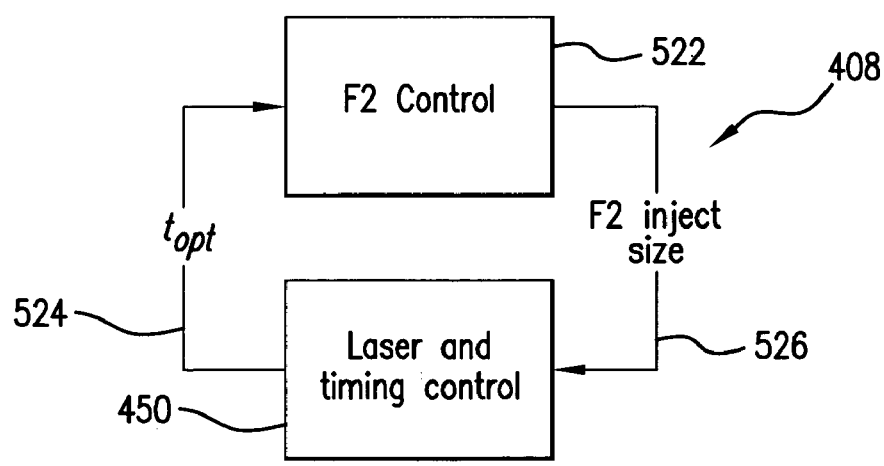
FIG. 12 shows schematically and in block diagram form a combination of short term and long term bandwidth control according to aspects of an embodiment of the present invention.
Figure 19:
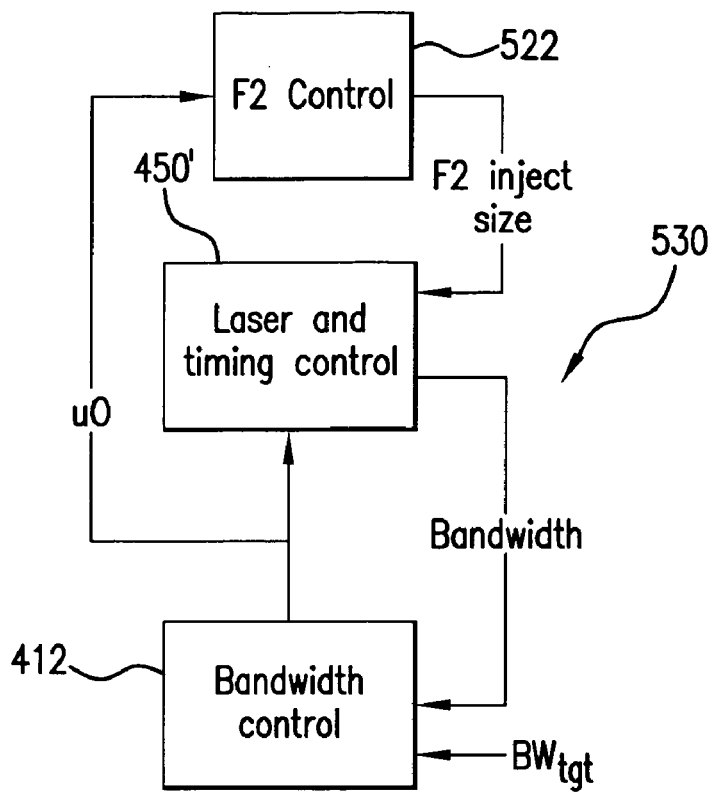
FIG. 19 shows schematically and in block diagram form an illustrative example of bandwidth and laser gas injection control according to aspects of an embodiment of the present invention.

A consequence of the above described timing control using controller 408 or 408', is that the value of the timing which yields maximum energy is no longer available as a measurement for other laser sub-systems. One which uses this value may be, e.g., the $F_2$ injection control system. Some versions of this system may use the deviation of the measured optimal timing from a reference optimal timing value to determine $F_2$ levels needed, e.g., in one or more of the laser chambers, e.g., the MO chamber in, e.g., a two chambered MOPA laser system. FIG. 12 illustrates an example of such an architecture 520. The $F_2$ controller 522 can take the optimal firing time $t_{opt}$, signal 524 as an input and use this value to adjust inject size, signal 526. The inject size signal 526 can be used also to influence the level of fluorine injected into the laser system chamber(s) and thus the amount of fluorine contained in the chamber(s) which in turn affects the optimal firing time differential. FIG. 19 shows how $F_2$ control can be modified to accommodate a timing control algorithm such as is discussed above.

For example where a desired operating point for a given desired bandwidth is computed, e.g., where a bandwidth controller computes the desired timing operating point, $u_0$. The $F_2$ controller 522 can take this target $u_0$ as an input. The $F_2$ controller 522 can then implement an algorithm, which can drive the target operating point, $u_0$ to a desired value. For example, it may try to drive the operating point to zero, or to some constant value other than zero, or to some other value, e.g., for maximizing laser system operating efficiency, thus ensuring that the laser is always operating at a selected point, e.g., at a maximum efficiency or at least within some desired range. The timing control 408, 408' and bandwidth control 412 together can quickly get the system to a desired bandwidth and then the $F_2$ control 522 can more slowly adjust the gas concentration so that the laser system is operating at the selected point, e.g., at a maximum efficiency.

Figure 20:
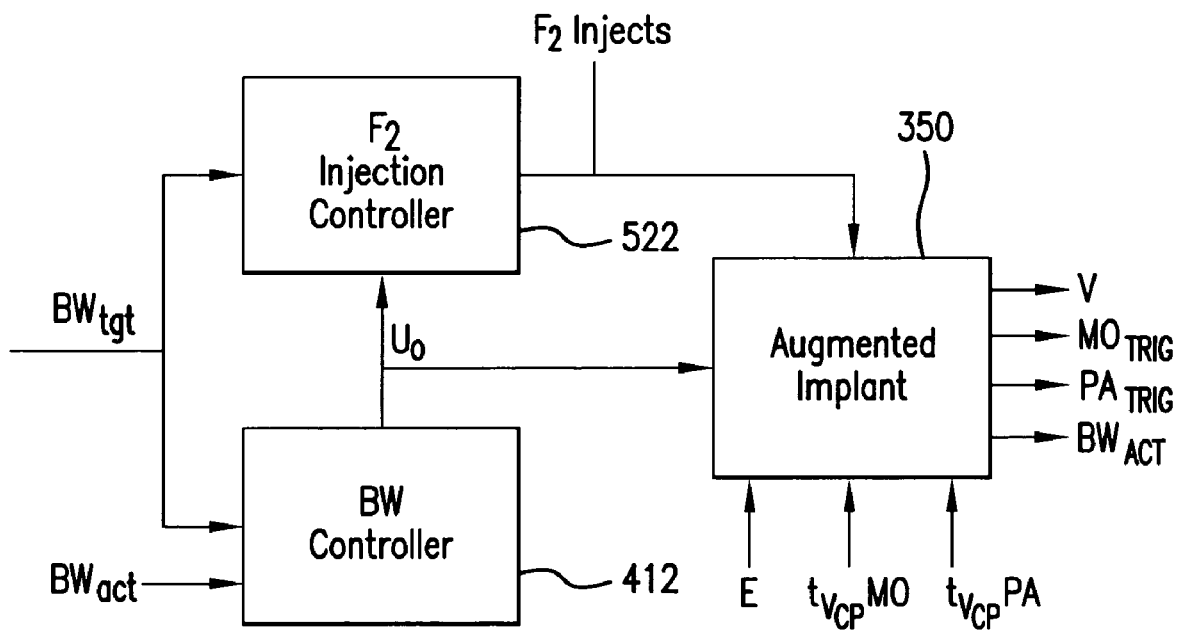
FIG. 20 shows schematically and in block diagram form an illustrative example of bandwidth and laser gas injection control according to aspects of an embodiment of the present invention.
Figure 21:
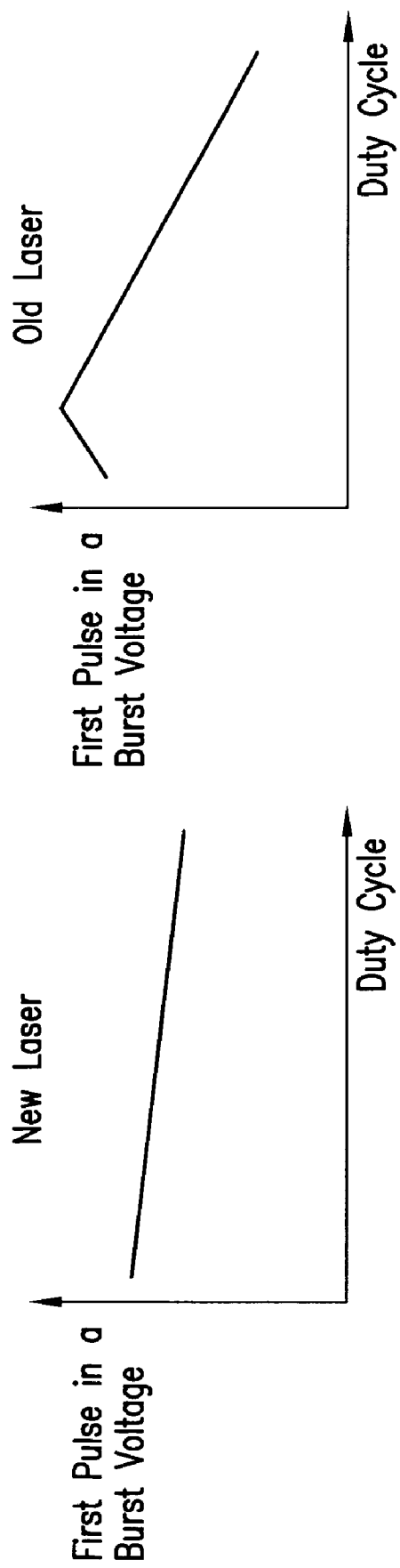
FIG. 21 illustrates by way of example plots of empiricaly determined data regarding duty cycle.
Figure 22:
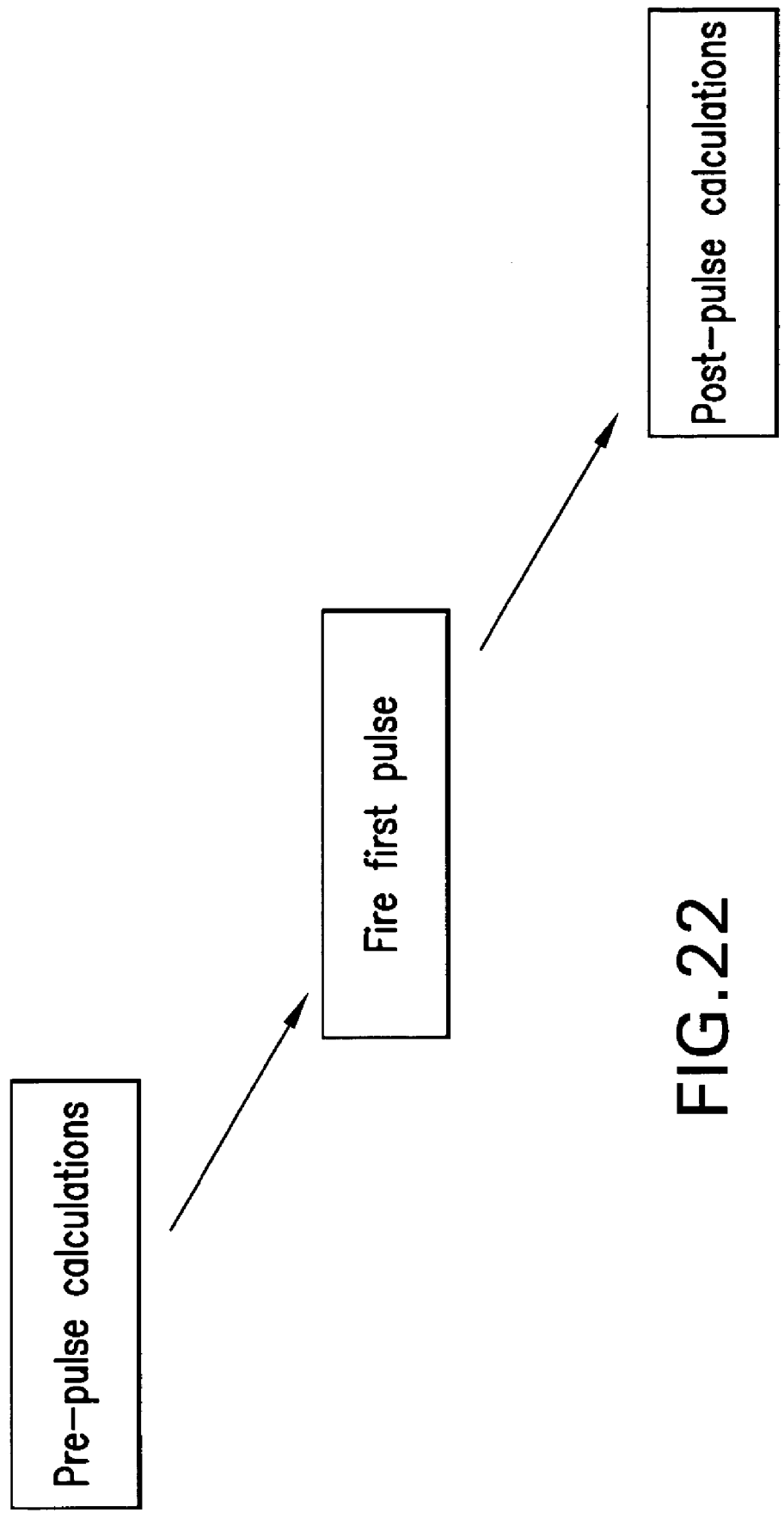
FIG. 22 illustrates an order or processing.

Turning now to FIG. 20 there is shown by way of example further details oaf aspects of an embodiment of the present invention shown in FIG. 19. Shown by way of example in FIG. 20 is a system 530 wherein the $F_2$ injection control system 522 determines and controls injections of $F_2$ gas into the laser 353, e.g., between refills, while the augmented plant 350 receives $u_0$ and E, $t_{VcpMO}$ and $t_{VcpPA}$ and produces an operating voltage V, a trigger signal to, e.g., close the solid state switch that determines the time of gas discharge between the electrodes in the MO chamber, $MO_{TRIG}$ and a trigger signal, e.g., that determined the shutting of the solid state switch that determines the time of the gas discharge between the electrodes in the PA chamber, $PA_{TRIG}$, and also an actual BW.

Shorter term the energy timing and control system may serve to drive u to equal $u_0$ according to aspects of an embodiment of the present invention and longer term the system may move $u_0$ over a gas life as fluorine is depleted to, e.g., change the operating point to maintain the desired BW or from gas life to gas life to move the BW target within the range of allowable bandwidth values.

It will be understood by those skilled in the art that a method and apparatus for controlling bandwidth in a multi-portion laser system comprising a first line narrowed oscillator laser system portion providing a line narrowed seed pulse to a second amplifier laser system portion, wherein selection of a differential firing time between the generation of the seed pulse in the first laser system portion and the generation of the laser gain medium in the amplifier laser system portion affects the bandwidth of a laser output light pulse from the multi-portion laser system is disclosed in the present application according to aspects of an embodiment of the present invention, which may comprise adjusting the differential firing time as a function of a measured bandwidth and a bandwidth target; estimating a current operating point; adjusting halogen gas injection as a function of a current operating point and a desired operating point. The differential firing time between, e.g., an MO and a PA in a multi-portion laser system may be adjusted by the use, e.g., of timing signals generated by an energy and timing controller that directs, e.g., the respective closing oaf a switch in a power supply for, e.g., the MO and another switch in a power supply for, e.g., the power supply for the PA in such a way as to contrl the timing of an electric discharge between electrodes in the MO laser portion and subsequently between electrodes in a PA (or PO) portion of the laser system, having a selected timing difference between the two discharges, at least within the tolerances of the available power supply and controller equipment as will be understood by those skilled in the art, e.g., within a few nanoseconds. The measured bandwidth may be measured according to well known techniques for such measurements such as, e.g., are shown in various of the issued patents and co-pending patent applications of applicant's assignee referenced above, and the bandwidth target may comprise a selected bandwidth, e.g., selected by the controller of the laser system, e.g., in response to a requested bandwidth from a utilizer of the laser output light pulses produced by the laser, e.g., an integrated circuit photolithography apparatus, as is well known in the art. This difference may constitute a bandwidth error. The estimating a current operating point step may comprise the use of a function which is readily computable or estimatable from an available measurement of a laser system operating parameter which is monotonic with respect to the differential firing time over the expected range of operation, e.g., the operating point may, e.g., lie on a curve, e.g., of operating points for varying operating parameters, e.g., the change in differential firing time as a function of operating voltage, e.g., at a constant energy or operating energy, e.g., at a constant operating voltage, and may be empirically determined for a given laser system and/or individual laser apparatus, and may, e.g., be periodically updated according to measured laser system operating parameters. Halogen gas injection may be controlled as is well known in the art and the current operating point may be shifted to a desired operating point by such injections according to aspects of an embodiment of the present invention.

The desired operating point may be determined as a function of at least one of target bandwidth, laser system duty cycle and laser system output pulse energy. The estimating of the current operating point step may comprise utilizing the difference between a current differential firing time and a reference differential firing time. The method and apparatus may further comprise adjusting the differential firing time as a function of bandwidth error. The method and apparatus may comprise selecting the reference differential timing to optimize laser system efficiency, e.g., at an extremum of a an operating voltage v. differential timing curve or operating energy v. differential timing curve. The method and apparatus may comprise estimating the difference between current differential firing time and reference differential firing time as a function of at least one of the derivative of laser system output pulse energy with respect to differential firing time, e.g., at constant voltage and the laser system output pulse energy, e.g., at the current operating point. The method and apparatus may comprise estimating the difference between current differential firing time and reference differential firing time as a function of at least one of the derivative of laser system discharge voltage with respect to differential firing time, e.g., at constant energy, the derivative of laser system output pulse energy with respect to laser system discharge voltage and the laser system output pulse energy, e.g., at the current operating point. The method and apparatus may comprise estimating the current operating point as a function of at least one of the derivative of the laser system discharge voltage with respect to differential firing time at constant energy and the laser system output pulse energy at the current operating point. The method and apparatus may comprise estimating the current operating point as (1/E)*dV/dt, where E is the laser system output pulse energy and dV/dt is the differential of the laser system discharge voltage with respect to differential firing time, e.g., at constant energy, e.g., at the current operating point.

The method and apparatus may comprise estimating the current operating point as a function of at least one of the derivative of the laser system output pulse energy with respect to differential firing time, e.g., at constant voltage and the laser system output pulse energy, e.g., at the current operating point. The method and apparatus may comprise the estimating of the current operating point step comprising utilizing the relationship (1/E)*dE/dt, where E is the laser system output pulse energy and dE/dt is the derivative of the laser system output pulse energy with respect to differential firing time, e.g., at constant voltage, e.g., at the current operating point. dE/dt may be estimated by applying a dither signal to the differential firing time and computing dE/dt utilizing dither, laser output pulse energy and the actual differential firing time. dE/dt may be estimated by applying a dither signal to the differential firing time and taking a respective ratio of the correlations of dither with laser output pulse energy and the actual differential firing time. dE/dt may be determined from the product of dE/dV and dV/dt.

The method and apparatus may comprise estimating the derivative of the laser system discharge voltage with respect to differential firing time at constant energy by applying a dither signal to the differential firing time; applying a scaled version of the dither signal to voltage; adapting the scale to minimize energy error; and taking dV/dt as the scale factor. The desired operating point according to such embodiment may comprise one which maximizes laser system efficiency. The apparatus and method may comprise adjusting the halogen gas inject sizes as a function of the difference between the current operating point and the desired operating point.

A method and apparatus for controlling bandwidth in a multi-portion laser system comprising a first line narrowed oscillator laser system portion providing a line narrowed seed pulse to a second amplifier laser system portion, wherein selection of a differential firing time between the generation of the seed pulse in the first laser system portion and the generation of the laser gain medium in the amplifier laser system portion effects the bandwidth of a laser output light pulse from the multi-portion laser system is disclosed which may, according to aspects of an embodiment of the present invention, comprise: adjusting a target operating point as a function of a measured bandwidth and a target bandwidth; estimating a current operating point; adjusting the differential firing time as a function of a current operating point and a target operating point in order to drive the current operating point to the target operating point; and adjusting halogen gas injection as a function of the current target operating point and a desired operating point. It will be understood by those skilled in the art that, e.g., a target operating point may be set by the control system, e.g., to accommodate bandwidth control, while a desired operating point, e.g., may be set by the system, e.g., for purposes of selecting an operating point to which the control system may utilize, e.g., $F_2$ injection control to drive the system operating point, which the system also maintains bandwidth control.

The estimating a current operating point step according to such embodiment may also comprise the use of a function which is readily computable or estimatable from an available measurement of a laser system operating parameter which is monotonic with respect to differential firing time over the expected range of operation, as discussed above. The estimating of the current operating point step may also comprise utilizing the difference between a current differential firing time and a reference differential firing time, as discussed above. The method and apparatus may also comprise estimating the current operating point as a function of at least one of the derivative of the laser system discharge voltage with respect to differential firing time at constant energy and the laser system output pulse energy at the current operating point, as discussed above. The method and apparatus may also comprise estimating the derivative of the laser system discharge voltage with respect to differential firing time at constant energy by applying a dither signal to the differential firing time; applying a scaled version of the dither signal to voltage; adapting the scale to minimize energy error; and taking dV/dt as the scale factor, as discussed above. The method and apparatus may also comprise estimating the current operating point as a function of at least one of the derivative of the laser system output pulse energy with respect to differential firing time at constant voltage and the laser system output pulse energy at the current operating point, as discusssed above. The differential of the laser system operating energy with respect to time may be estimated by applying a dither signal to the differential firing time and taking a respective ratio of the correlations of dither with laser output pulse energy and the actual differential firing time, as discussed above. The differential of the laser system operating energy with respect to time may be estimated by applying a dither signal to the differential firing time and computing dE/dt utilizing dither, laser output pulse energy and the actual differential firing time, as discussed above. The differential of the laser system operating energy with respect to time may be determined from the product of dE/dV and dV/dt, as discussed above. The desired operating point may comprise one which maximizes laser system efficiency, as discussed above.

It will be understood by those skilled in the art that the aspects of embodiments of the present invention disclosed above are intended to be preferred embodiments only and not to limit the disclosure of the present invention(s) in any way and particularly not to a specific preferred embodiment alone. Many changes and modification can be made to the disclosed aspects of embodiments of the disclosed invention(s) that will be understood and appreciated by those skilled in the art. The appended claims are intended in scope and meaning to cover not only the disclosed aspects of embodiments of the present invention(s) but also such equivalents and other modifications and changes that would be apparent to those skilled in the art. In additions to changes and modifications to the disclosed and claimed aspects of embodiments of the present invention(s) noted above others could be implemented.

While the particular aspects of embodiment(s) of the MOPA GAS DISCHARGE LASER BANDWIDTH CONTROL THROUGH DISCHARGE TIMING described and illustrated in this patent application in the detail required to satisfy 35 U.S.C. §112 is fully capable of attaining any above-described purposes for, problems to be solved by or any other reasons for or objects of the aspects of an embodiment(s) above described, it is to be understood by those skilled in the art that it is the presently described aspects of the described embodiment(s) of the present invention are merely exemplary, illustrative and representative of the subject matter which is broadly contemplated by the present invention. The scope of the presently described and claimed aspects of embodiments fully encompasses other embodiments which may now be or may become obvious to those skilled in the art based on the teachings of the Specification. The scope of the present MOPA GAS DISCHARGE LASER BANDWIDTH CONTROL THROUGH DISCHARGE TIMING is solely and completely limited by only the appended claims and nothing beyond the recitations of the appended claims. Reference to an element in such claims in the singular is not intended to mean nor shall it mean in interpreting such claim element "one and only one" unless explicitly so stated, but rather "one or more". All structural and functional equivalents to any of the elements of the above-described aspects of an embodiment(s) that are known or later come to be known to those of ordinary skill in the art are expressly incorporated herein by reference and are intended to be encompassed by the present claims. Any term used in the specification and/or in the claims and expressly given a meaning in the Specification and/or claims in the present application shall have that meaning, regardless of any dictionary or other commonly used meaning for such a term. It is not intended or necessary for a device or method discussed in the Specification as any aspect of an embodiment to address each and every problem sought to be solved by the aspects of embodiments disclosed in this application, for it to be encompassed by the present claims. No element, component, or method step in the present disclosure is intended to be dedicated to the public regardless of whether the element, component, or method step is explicitly recited in the claims. No claim element in the appended claims is to be construed under the provisions of 35 U.S.C. §112, sixth paragraph, unless the element is expressly recited using the phrase "means for" or, in the case of a method claim, the element is recited as a "step" instead of an "act".

We claim:

1. A method for controlling bandwidth in a multi-portion laser system comprising a first line narrowed oscillator laser system portion having a first gain generator providing a line narrowed seed pulse to a second gain generator laser system portion, wherein selection of a differential firing time between the generation of the seed pulse in the first laser system portion and the generation of the laser gain medium in the second laser system portion effects the bandwidth of a laser output light pulse from the multi-portion laser system, comprising:

adjusting a target operating point as a function of a measured bandwidth and a target bandwidth;

estimating a current operating point;

adjusting the differential firing time as a function of the current operating point and the target operating point in order to drive the current operating point to the target operating point;

and wherein the estimating a current operating point step comprises the use of a function which is readily computable or estimatable from an available measurement of a laser system operating parameter and which function also is monotonic with respect to differential firing time over the expected range of operation;

the estimating of the current operating point step comprises utilizing the difference between a current differential firing time and a reference differential firing time; and dE/dt is estimated by applying a dither signal to the differential firing time and taking a respective ratio of the correlations of dither with laser output pulse energy and the actual differential firing time.

2. The method of claim 1 further comprising:
adjusting halogen gas injection as a function of a current operating point and a desired operating point.

3. The method of claim 1 further comprising:
a desired operating point is determined as a function of at least one of target bandwidth, laser system duty cycle and laser system output pulse energy.

4. The method of claim 2 further comprising:
the desired operating point is determined as a function of at least one of target bandwidth, laser system duty cycle and laser system output pulse energy.

5. The method of claim 2 further comprising:
the desired operating point comprises one which maximizes laser system efficiency.

6. The method of claim 1 further comprising:
selecting the reference differential timing to optimize laser system efficiency.

7. The method of claim 2 further comprising:
selecting the reference differential timing to optimize laser system efficiency.

8. A method for controlling bandwidth in a multi-portion laser system comprising a first line narrowed oscillator laser system portion having a first gain generator providing a line narrowed seed pulse to a second gain generator laser system portion, wherein selection of a differential firing time between the generation of the seed pulse in the first laser system portion and the generation of the laser gain medium in the second laser system portion effects the bandwidth of a laser output light pulse from the multi-portion laser system, comprising:

adjusting a target operating point as a function of a measured bandwidth and a target bandwidth;

estimating a current operating point;

adjusting the differential firing time as a function of the current operating point and the target operating point in order to drive the current operating point to the target operating point;

and wherein the estimating a current operating point step comprises the use of a function which is readily computable or estimatable from an available measurement of a laser system operating parameter and which function also is monotonic with respect to differential firing time over the expected range of operation;

the estimating of the current operating point step comprises utilizing the difference between a current differential firing time and a reference differential firing time;

estimating the difference between current differential firing time and reference differential firing time as a function of at least one of the derivative of laser system output pulse energy with respect to differential firing time at constant voltage and the laser system output pulse energy at the current operating point; and dE/dt is determined from the product of dE/dV and dV/dt.

9. The method of claim 1 further comprising:
dE/dt is determined from the product of dE/dV and dV/dt.

10. The method of claim 8 further comprising:
estimating the derivative of the laser system discharge voltage with respect to differential firing time at constant energy by applying a dither signal to the differential firing time;

applying a scaled version of the dither signal to voltage;
adapting the scale to minimize energy error; and
taking dV/dt as the scale factor.

11. The method of claim 9 further comprising:
estimating the derivative of the laser system discharge voltage with respect to differential firing time at constant energy by applying a dither signal to the differential firing time;

applying a scaled version of the dither signal to voltage;
adapting the scale to minimize energy error; and
taking dV/dt as the scale factor.

12. The method of claim 1 further comprising:
estimating the difference between current differential firing time and reference differential firing time as a function of at least one of the derivative of laser system discharge voltage with respect to differential firing time at constant energy, the derivative of laser system output pulse energy with respect to laser system discharge voltage and the laser system output pulse energy at the current operating point.

13. The method of claim 2 further comprising:
estimating the difference between current differential firing time and reference differential firing time as a function of at least one of the derivative of laser system discharge voltage with respect to differential firing time at constant energy, the derivative of laser system output pulse energy with respect to laser system discharge voltage and the laser system output pulse energy at the current operating point.

14. A method for controlling bandwidth in a multi-portion laser system comprising a first line narrowed oscillator laser system portion having a first gain generator providing a line narrowed seed pulse to a second gain generator laser system portion, wherein selection of a differential firing time between the generation of the seed pulse in the first laser system portion and the generation of the laser gain medium in the second laser system portion effects the bandwidth of a laser output light pulse from the multi-portion laser system, comprising:

adjusting a target operating point as a function of a measured bandwidth and a target bandwidth;

estimating a current operating point;

adjusting the differential firing time as a function of the current operating point and the target operating point in order to drive the current operating point to the target operating point;

and wherein the estimating a current operating point step comprises the use of a function which is readily computable or estimatable from an available measurement of a laser system operating parameter and which function also is monotonic with respect to differential firing time over the expected range of operation;

the estimating of the current operating point step comprises utilizing the difference between a current differential firing time and a reference differential firing time;

estimating the difference between current differential firing time and reference differential firing time as a function of at least one of the derivative of laser system discharge voltage with respect to differential firing time at constant energy, the derivative of laser system output pulse energy with respect to laser system discharge voltage and the laser system output pulse energy at the current operating point;

estimating the derivative of the laser system discharge voltage with respect to differential firing time at constant energy by applying a dither signal to the differential firing time;

applying a scaled version of the dither signal to voltage;

adapting the scale to minimize energy error; and taking dV/dt as the scale factor.

15. The method of claim 13 further comprising:

estimating the derivative of the laser system discharge voltage with respect to differential firing time at constant energy by applying a dither signal to the differential firing time;

applying a scaled version of the dither signal to voltage;

adapting the scale to minimize energy error; and taking dV/dt as the scale factor.

16. The method of claim 1 further comprising:

estimating the current operating point as a function of at least one of the derivative of the laser system discharge voltage with respect to differential firing time at constant energy and the laser system output pulse energy at the current operating point.

17. The method of claim 2 further comprising:

estimating the current operating point as a function of at least one of the derivative of the laser system discharge voltage with respect to differential firing time at constant energy and the laser system output pulse energy at the current operating point.

18. The method of claim 16 further comprising:

estimating the current operating point as $(1/E)*dV/dt$, where E is the laser system output pulse energy and dV/dt is the differential of the laser system discharge voltage with respect to differential firing time at constant energy at the current operating point.

19. The method of claim 17 further comprising:

estimating the current operating point as $(1/E)*dV/dt$, where E is the laser system output pulse energy and dV/dt is the differential of the laser system discharge voltage with respect to differential firing time at constant energy at the current operating point.

20. The method of claim 18 further comprising:

estimating the derivative of the laser system discharge voltage with respect to differential firing time at constant energy by applying a dither signal to the differential firing time;

applying a scaled version of the dither signal to voltage;

adapting the scale to minimize energy error; and taking dV/dt as the scale factor.

21. The method of claim 19 further comprising:

estimating the derivative of the laser system discharge voltage with respect to differential firing time at constant energy by applying a dither signal to the differential firing time;

applying a scaled version of the dither signal to voltage;

adapting the scale to minimize energy error; and taking dV/dt as the scale factor.

22. The method of claim 16 further comprising:

estimating the derivative of the laser system discharge voltage with respect to differential firing time at constant energy by applying a dither signal to the differential firing time;

applying a scaled version of the dither signal to voltage;

adapting the scale to minimize energy error; and taking dV/dt as the scale factor.

23. The method of claim 17 further comprising:

estimating the derivative of the laser System discharge voltage with respect to differential firing time at constant energy by applying a dither signal to the differential firing time;

applying a scaled version of the dither signal to voltage;

adapting the scale to minimize energy error; and taking dV/dt as the scale factor.

24. The method of claim 1 further comprising:

estimating the current operating point as a function of at least one of the derivative of the laser system output pulse energy with respect to differential firing time at constant voltage and the laser system output pulse energy at the current operating point.

25. The method of claim 2 further comprising:

estimating the current operating point as a function of at least one of the derivative of the laser system output pulse energy with respect to differential firing time at constant voltage and the laser system output pulse energy at the current operating point.

26. The method of claim 24 further comprising:

the estimating of the current operating point step comprises utilizing the relationship $(1/E)*dE/dt$, where E is the laser system output pulse energy and dE/dt is the derivative of the laser system output pulse energy with respect to differential firing time at constant voltage at the current operating point.

27. The method of claim 25 further comprising:

the estimating of the current operating point step comprises utilizing the relationship $(1/E)*dE/dt$, where E is the laser system output pulse energy and dE/dt is the derivative of the laser system output pulse energy with respect to differential firing time at constant voltage at the current operating point.

28. The method of claim 26 further comprising:

dE/dt is estimated by applying a dither signal to the differential firing time and taking a respective ratio of the correlations of dither with laser output pulse energy and the actual differential firing time.

29. The method of claim 27 further comprising:

dE/dt is estimated by applying a dither signal to the differential firing time and taking a respective ratio of the correlations of dither with laser output pulse energy and the actual differential firing time.

30. The method of claim 26 further comprising:
dE/dt is determined from the product of dE/dV and dV/dt.

31. The method of claim 27 further comprising:
dE/dt is determined from the product of dE/dV and dV/dt.

32. The method of claim 30 further comprising:
estimating the derivative of the laser system discharge voltage with respect to differential firing time at constant energy by applying a dither signal to the differential firing time;
applying a scaled version of the dither signal to voltage; adapting the scale to minimize energy error; and
taking dV/dt as the scale factor.

33. The method of claim 31 further comprising:
estimating the derivative of the laser system discharge voltage with respect to differential firing time at constant energy by applying a dither signal to the differential firing time;
applying a scaled version of the dither signal to voltage; adapting the scale to minimize energy error; and
taking dV/dt as the scale factor.

* * * * *